(12) United States Patent
Fryman et al.

(10) Patent No.: US 10,983,793 B2
(45) Date of Patent: Apr. 20, 2021

(54) ARRAY BROADCAST AND REDUCTION SYSTEMS AND METHODS

(71) Applicant: INTEL CORPORATION, Santa Clara, CA (US)

(72) Inventors: Joshua Fryman, Corvallis, OR (US); Ankit More, San Mateo, CA (US); Jason Howard, Portland, OR (US); Robert Pawlowski, Beaverton, OR (US); Yigit Demir, Santa Clara, CA (US); Nick Pepperling, Portland, OR (US); Fabrizio Petrini, Palo Alto, CA (US); Sriram Aananthakrishnan, Portland, OR (US); Shaden Smith, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 16/369,846

(22) Filed: Mar. 29, 2019

(65) Prior Publication Data
US 2020/0310795 A1 Oct. 1, 2020

(51) Int. Cl.
*G06F 9/30* (2018.01)
*G06F 13/28* (2006.01)
(Continued)

(52) U.S. Cl.
CPC ........ *G06F 9/3004* (2013.01); *G06F 9/30098* (2013.01); *G06F 9/30149* (2013.01);
(Continued)

(58) Field of Classification Search
None
See application file for complete search history.

(56) References Cited

U.S. PATENT DOCUMENTS

| 4,729,095 A | 3/1988 | Colley et al. |
| 6,157,740 A * | 12/2000 | Buerkle ............... H04N 19/61 375/240.18 |

(Continued)

OTHER PUBLICATIONS

European Patent Office, Communication and European Search Report dated Jul. 21, 2020 in European patent application No. 20 15 6045, 7 pages total.

*Primary Examiner* — Michael Sun
(74) *Attorney, Agent, or Firm* — Trop, Pruner & Hu, P.C.

(57) ABSTRACT

The present disclosure is directed to systems and methods of performing one or more broadcast or reduction operations using direct memory access (DMA) control circuitry. The DMA control circuitry executes a modified instruction set architecture (ISA) that facilitates the broadcast distribution of data to a plurality of destination addresses in system memory circuitry. The broadcast instruction may include broadcast of a single data value to each destination address. The broadcast instruction may include broadcast of a data array to each destination address. The DMA control circuitry may also execute a reduction instruction that facilitates the retrieval of data from a plurality of source addresses in system memory and performing one or more operations using the retrieved data. Since the DMA control circuitry, rather than the processor circuitry performs the broadcast and reduction operations, system speed and efficiency is beneficially enhanced.

26 Claims, 20 Drawing Sheets

(51) Int. Cl.
*G06F 9/32* (2018.01)
*G06F 9/455* (2018.01)

(52) U.S. Cl.
CPC .......... *G06F 9/30156* (2013.01); *G06F 9/32* (2013.01); *G06F 9/45504* (2013.01)

(56) References Cited

U.S. PATENT DOCUMENTS

| | | | |
|---|---|---|---|
| 6,173,388 B1* | 1/2001 | Abercrombie | G06F 9/30145 345/563 |
| 8,291,033 B2* | 10/2012 | Archer | G06F 15/17318 709/212 |
| 8,332,460 B2* | 12/2012 | Blocksome | G06F 15/17318 709/201 |
| 10,452,399 B2* | 10/2019 | Burger | G06F 9/3802 |
| 2007/0073922 A1 | 3/2007 | Go et al. | |
| 2009/0006662 A1* | 1/2009 | Chen | G06F 13/28 710/22 |
| 2009/0006663 A1* | 1/2009 | Archer | G06F 13/28 710/22 |
| 2014/0059322 A1* | 2/2014 | Ould-Ahmed-Vall | G06F 9/30032 712/5 |
| 2018/0150421 A1* | 5/2018 | Jain | G06F 13/102 |

* cited by examiner

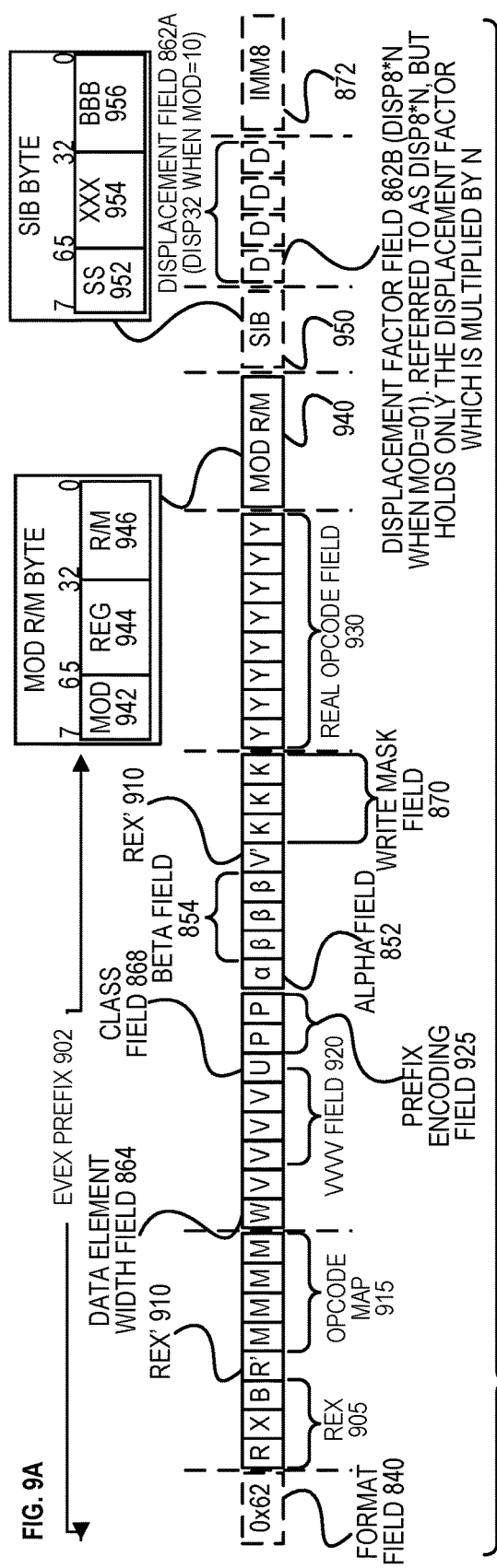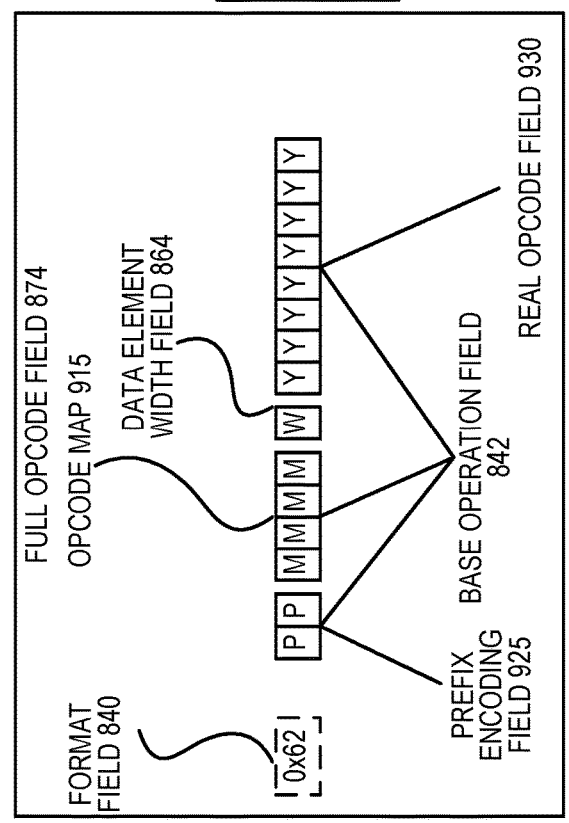

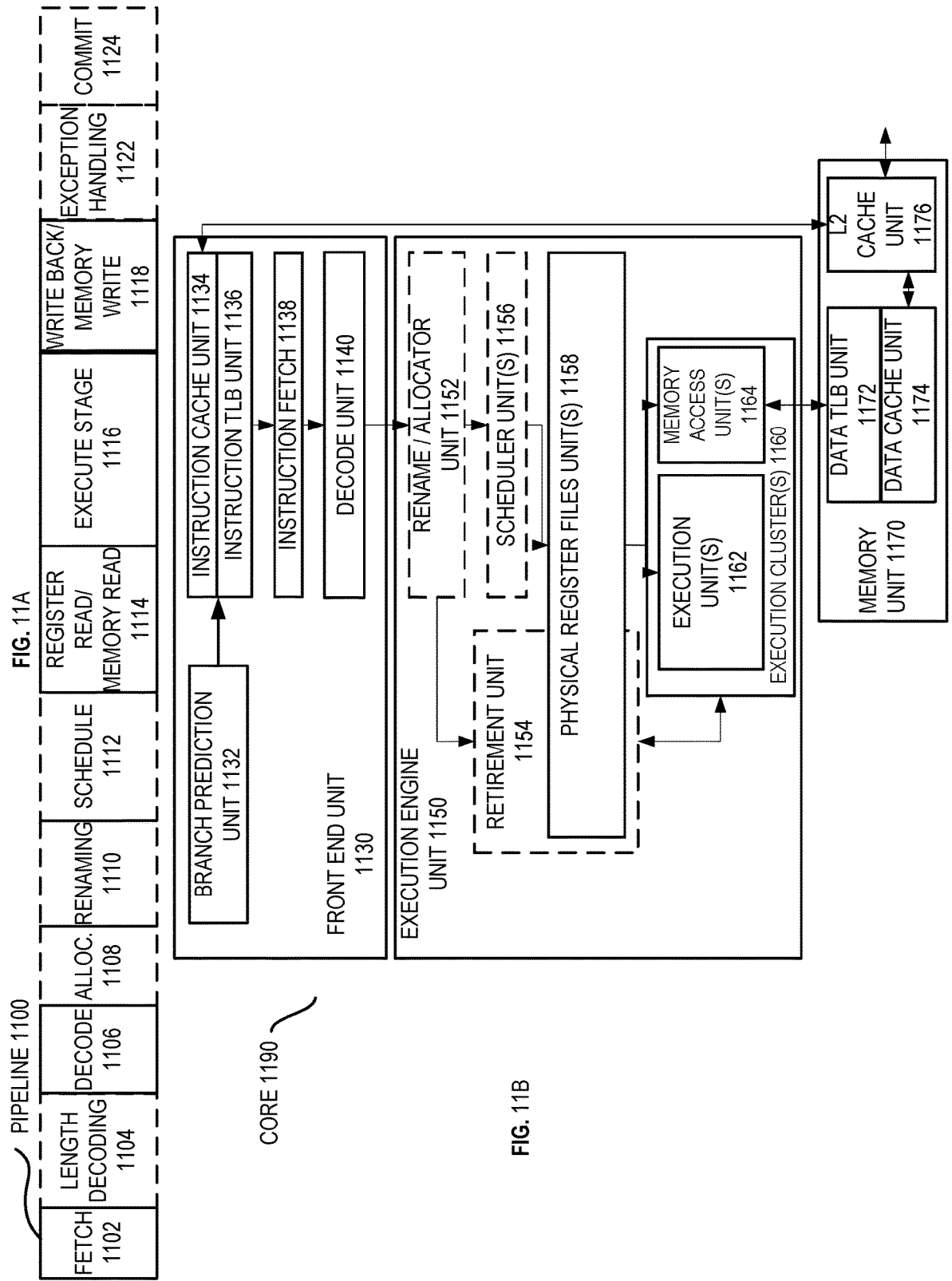

ARRAY BROADCAST AND REDUCTION SYSTEMS AND METHODS

TECHNICAL FIELD

The present disclosure relates to systems and methods of performing array operations in memory circuitry, more specifically using direct memory access control circuitry to perform array operations.

BACKGROUND

Many graphic workloads include situations where a single vertex must communicate data, such as an instruction, a single value, or an array or values, to at least some of its neighboring vertices. A list of such receptor vertices may be represented as a list using a format such as compressed sparse row (CSR) format. The list of receptor vertices must be accessed prior to communicating the data to determine the memory location of each of the receptor vertices that will receive the data. The broadcast value or instruction is then communicated to each receptor vertex, at times as an atomic operation (i.e., increment/decrement, add, mul, bitop).

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIGS. 9A, 9B, 9C, and 9D are block diagrams illustrating an exemplary specific vector friendly instruction format according to embodiments of the invention;

FIG. 11A is a block diagram illustrating both an exemplary in-order pipeline and an exemplary register renaming, out-of-order issue/execution pipeline according to embodiments of the invention.

FIG. 11B is a block diagram illustrating both an exemplary embodiment of an in-order architecture core and an exemplary register renaming, out-of-order issue/execution architecture core to be included in a processor according to embodiments of the invention;

Figure 1:
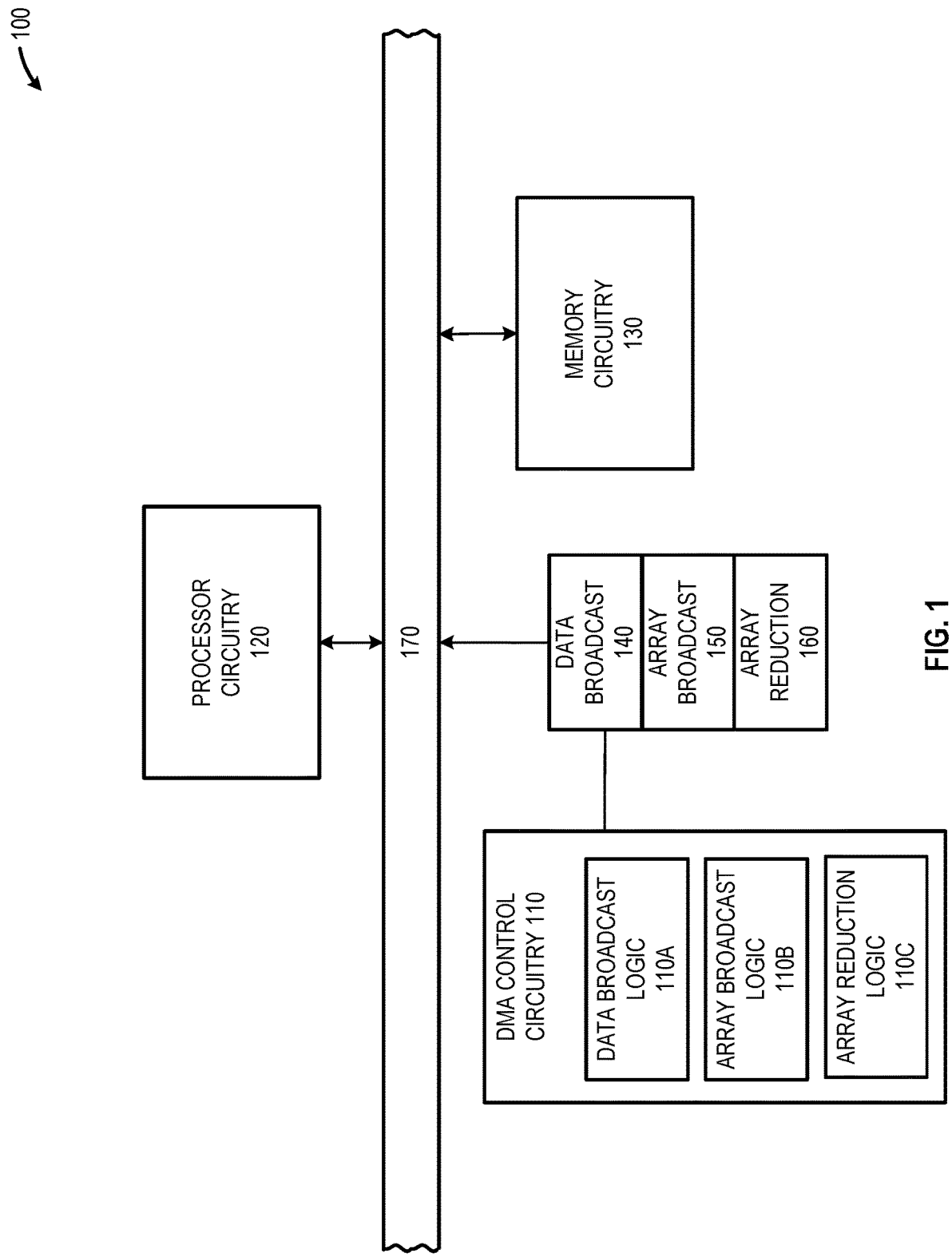
FIG. 1 is a block diagram of an illustrative system that includes a direct memory access (DMA) control circuitry, processor circuitry, and memory circuitry; where the DMA control circuitry includes an instruction set architecture (ISA) that includes instructions capable of conditionally populating data to a plurality of memory addresses (i.e., a broadcast instruction) with data or collapsing data at a plurality of memory addresses to one or more values (i.e., a reduce instruction), in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The Seeded Graph Matching (SGM) workload provides an example of such broadcast usage. SGM attempts to establish a correspondence between the vertices of two graphs in an attempt to maximize the adjacency lists between the graphs under the constraint that the correspondence will respect a user-provided correspondence (i.e., the seeds of the matching). A parallel implementation of SGM may be broken into a plurality of subroutines, such as ZAQB. The ZAQB subroutine performs an incremental update for each column of the second graph into a vector of the corresponding columns of the first graph.

The Breadth First Search (BFS) algorithm used to test for connectivity or compute the single-source shortest path of unweighted graphs, provides another example of such broadcast usage. The BFS algorithm traverses the graph by exploring all of the nodes at the present depth prior to moving on to the nodes at a subsequent depth level. The BFS algorithm begins at a given starting node and terminates when all of the nodes reachable from the starting node have been discovered. The parent node assignment carries out the discovery of neighbor nodes, and returns a parent vector based on the provided starting node. The top-down portion of the BFS algorithm searches active nodes to determine whether the node has been previously visited by broadcasting a compare-swap instruction to the active nodes. If a node has not been visited, the node is claimed using a unique parent identifier. Once an active node is claimed, presence bytes may be broadcast to the neighboring nodes as the next level in the search.

For large graphs, a parent node may have on the order of 10⁵ or more neighboring nodes to which the parent node will broadcast. Thus, algorithms such as BFS are resource intensive and tend to tie-up significant core pipeline resources. In the Programmable Unified Memory Architecture (PUMA) graph processor, a single core may have four-multithreaded pipelines. Multiple pipelines allow a programmer to split the elements of the broadcast among 64 threads. While the availability of multiple threads allows the process to be handled more efficiently, a significant resource burden is still imposed on the pipelines for an extended number of clock cycles. Additionally, distribution of the elements among the threads consumes overhead and the potential for vertices to be located across a multi-node distributed global address space (DGAS) system may lead to extreme load imbalances between threads.

In both the BFS and the SGM, each element of the broadcast requires the following operations:
1. A read of the pre-built neighbor index (e.g., a list of vertices in CSR format) from memory;
2. Dereferencing the value to determine the neighbor location in physical memory space; and
3. Generating and communicating a remote atomic request to the neighbor location.

The systems and methods disclosed herein beneficially enhance the instruction set available to direct memory access (DMA) control circuitry by including a number of instructions that enable the DMA control circuitry to autonomously: determine starting data (e.g., a single value or an array of values), receive a starting node address, and a memory offset value that identifies each of the neighboring nodes. Such systems and methods beneficially reduce the traffic within processor pipelines associated with more traditional array broadcast operations such as SGM and BFS discussed above. The systems and methods disclosed herein beneficially enhance the instruction set available to DMA control circuitry by including at least one instruction that permits the DMA control circuitry to autonomously perform an array reduction operation using data stored as array elements in each of a plurality of memory locations.

A direct memory access (DMA) system is provided. The system may include: DMA control circuitry coupled to memory circuitry, the DMA control circuitry to execute at least one of: a data broadcast instruction, an array broadcast instruction, or an array reduction instruction: wherein, upon execution of the data broadcast instruction, the DMA control circuitry to: causes a data broadcast operation of a first data value to each of a plurality of memory addresses that begin at a base memory address location included in the data broadcast instruction and increment by a defined memory address offset also included in the data broadcast instruction; wherein, upon execution of the array broadcast instruction, the DMA control circuitry to: cause an array broadcast operation of an array that includes a defined number of elements to each of a plurality of memory addresses that begin at a base memory address location included in the array broadcast instruction and increment by a defined memory address offset also included in the array broadcast instruction; and wherein, upon execution of the array reduction instruction, the DMA control circuitry to: perform one or more operations to generate an output value using respective values stored at each of a plurality of memory address locations, the plurality of memory address locations including a base memory address location included in the array reduction instruction and a defined memory address offset included in the array reduction instruction.

An electronic device is provided. The electronic device may include: processor circuitry; memory circuitry coupled to the processor circuitry; and DMA control circuitry coupled to the memory circuitry, the DMA control circuitry to execute at least one of: a data broadcast instruction, an array broadcast instruction, or an array reduction instruction: wherein, upon execution of the data broadcast instruction, the DMA control circuitry to: causes a data broadcast operation of a first data value to each of a plurality of memory addresses that begin at a base memory address location included in the data broadcast instruction and increment by a defined memory address offset also included in the data broadcast instruction; wherein, upon execution of the array broadcast instruction, the DMA control circuitry to: cause an array broadcast operation of an array that includes a defined number of elements to each of a plurality of memory addresses that begin at a base memory address location included in the array broadcast instruction and increment by a defined memory address offset also included in the array broadcast instruction; and wherein, upon execution of the array reduction instruction, the DMA control circuitry to: perform one or more operations to generate an output value using respective values stored at each of a plurality of memory address locations, the plurality of memory address locations including a base memory address location included in the array reduction instruction and a defined memory address offset included in the array reduction instruction.

A DMA broadcast method is provided. The method may include: executing, by DMA control circuitry, at least one of: a data broadcast instruction, an array broadcast instruction, or an array reduction instruction: wherein executing the data broadcast instruction comprises: broadcasting, by the DMA control circuitry, a first data value to each of a plurality of memory addresses that begin at a base memory address location included in the data broadcast instruction and increment by a defined memory address offset also included in the data broadcast instruction; wherein executing the array broadcast instruction comprises: broadcasting, by the DMA control circuitry, an array that includes a defined number of elements to each of a plurality of memory addresses that begin at a base memory address location included in the array broadcast instruction and increment by a defined memory address offset also included in the array broadcast instruction; and wherein executing the array reduction instruction comprises: performing, by the DMA control circuitry, one or more operations to generate an output value using respective values stored at each of a plurality of memory address locations, the plurality of memory address locations including a base memory address location included in the array reduction instruction and a defined memory address offset included in the array reduction instruction.

A non-transitory storage device is provided. The non-transitory storage device includes instructions that, when executed by direct memory access (DMA) control circuitry, cause the DMA control circuitry to: execute at least one of: a data broadcast instruction, an array broadcast instruction, or an array reduction instruction: wherein execution of the data broadcast instruction causes the DMA control circuitry to: broadcast a first data value to each of a plurality of memory addresses that begin at a base memory address location included in the data broadcast instruction and increment by a defined memory address offset also included in the data broadcast instruction; wherein execution of the array broadcast instruction causes the DMA control circuitry to: broadcast an array that includes a defined number of elements to each of a plurality of memory addresses that begin at a base memory address location included in the array broadcast instruction and increment by a defined memory address offset also included in the array broadcast instruction; and wherein execution of the array reduction instruction causes the DMA control circuitry to: perform one or more operations to generate an output value using respective values stored at each of a plurality of memory address locations, the plurality of memory address locations including a base memory address location included in the array reduction instruction and a defined memory address offset included in the array reduction instruction.

A DMA broadcast system is provided. The system may include: means for executing at least one of: a data broadcast instruction, an array broadcast instruction, or an array reduction instruction: wherein the means for executing the data broadcast instruction comprises: means for broadcasting a first data value to each of a plurality of memory addresses that begin at a base memory address location included in the data broadcast instruction and increment by a defined memory address offset also included in the data broadcast instruction; wherein the means for executing the array broadcast instruction comprises: means for broadcasting an array that includes a defined number of elements to each of a plurality of memory addresses that begin at a base memory address location included in the array broadcast instruction and increment by a defined memory address offset also included in the array broadcast instruction; and wherein the means for executing the array reduction instruction comprises: means for performing one or more operations to generate an output value using respective values stored at each of a plurality of memory address locations, the plurality of memory address locations including a base memory address location included in the array reduction instruction and a defined memory address offset included in the array reduction instruction.

As used herein the terms "about" or "approximately" when used to prefix an enumerated value should be interpreted to indicate a value that is plus or minus 15% of the enumerated value. Thus, a value that is listed as "about 100" or "approximately 100%" should be understood to represent a value that could include any value or group of values between 85 (i.e., −15%) to 115 (i.e., +15%).

As used herein the term "processor circuit" may refer to the physical circuitry included in a microprocessor or central processing unit (CPU), a virtual instantiation of a processor on physical circuitry included in a microprocessor or CPU, or combinations thereof. The term processor circuit may refer to a single- or multi-thread processor core circuit.

FIG. 1 is a block diagram of an illustrative system 100 that includes a direct memory access (DMA) control circuitry 110, processor circuitry 120, and memory circuitry 130—the DMA control circuitry 110 includes an instruction set architecture (ISA) that includes instructions capable of conditionally populating data to a plurality of memory addresses (i.e., a broadcast instruction) with data or collapsing data at a plurality of memory addresses to one or more values (i.e., a reduce instruction), in accordance with at least one embodiment described herein. In embodiments, the DMA control circuitry 110 includes but is not limited to: data broadcast logic 110A, array broadcast logic 110B, and array reduction broadcast logic 110C. Beneficially, the DMA control circuitry 110 interprets the instruction to perform the broadcast or reduce operation as a single instruction and performs the broadcast or reduce operations in the memory circuitry 130 without the involvement of or burdening the processor circuitry 120. In embodiments, the DMA control circuitry 110 may execute a data broadcast instruction 140 that causes a broadcast of data representative of a single value at a defined first memory location to a plurality of memory locations, each of the plurality of memory locations at a defined offset from the first location. In embodiments, the DMA control circuitry 110 may execute an array broadcast instruction 150 that causes a broadcast of data representative of an array containing a plurality of values at a defined first memory location to a plurality of memory locations, each of the plurality of memory locations at a defined offset from the first location. In embodiments, the DMA control circuitry 110 may execute a reduce broadcast instruction 160 that causes a reduction of data stored at each of a plurality of memory locations to a single memory location.

In embodiments, the DMA control circuitry 110 interprets data representative of a list in a list of offsets format. In such embodiments, the DMA control circuitry 110 provides a base value (e.g., a 64-bit canonical address) and the address of the offset list as separate registers in the instruction. Such a construction permits the use of offset data in different DMA operations various applications while, minimizing or eliminating the need for data structure reorganization. In embodiments, the list stored in the memory circuitry 130 includes integers representing a count of elements. Such a construction permits applications to provide the original vertex identifiers without scaling by the size of individual elements. In embodiments, the integers can include 4-bit or 8-bit, signed or unsigned, integers.

In embodiments, the data broadcast logic 110A performs or otherwise causes the performance of a data broadcast operation upon receipt of a data broadcast instruction 140 that includes the following fields:
- a first field that includes data representative of a pointer to an array of addresses/offsets;
- a second field that includes data representative of the source data to broadcast;
- a third field that includes data representative of a number of physical address destinations in memory circuitry 130 to receive the data broadcast; and
- a fourth field that includes data representative of a base address in the memory circuitry for base plus offset format.

In some embodiments, in addition to the above fields, the data broadcast instruction 140 may further include a fifth field that includes data representative of a compare value where the memory operation includes a compare-overwrite.

In embodiments, the array broadcast logic 110B performs or otherwise causes the performance of an array broadcast operation upon receipt of an array broadcast instruction 150 that includes:
- a first field that includes data representative of a pointer to an array of addresses/offsets;
- a second field that includes data representative of the base address in memory circuitry 130 for the source data to broadcast;
- a third field that includes data representative of a number of physical address destinations in memory circuitry 130 to receive the array broadcast;
- a fourth field that includes data representative of the number of array elements to broadcast; and
- a fifth field that includes data representative of a base address in the memory circuitry for base plus offset format.

In embodiments, the array reduction logic 110C performs or otherwise causes the performance of an array reduction operation upon receipt of an array reduce instruction 160 that includes:

- a first field that includes data representative of a pointer to an array of addresses/offsets;
- a second field that includes data representative of a destination address in memory circuitry 130 to receive the result of the array reduction;
- a third field that includes data representative of source physical addresses in memory circuitry 130 to include in the array for reduction; and
- a fourth field that includes data representative of the base address in memory circuitry 130 for the source data to broadcast.

The DMA control circuitry 110 may include any number and/or combination of currently available and/or future developed electronic components, semiconductor devices, and/or logic elements capable of utilizing an ISA that includes data broadcast, array broadcast, and array reduce instructions as described herein. In embodiments, the processor circuitry 120 may initiate one or more array operations that the DMA control circuitry 110, using the ISA as described herein, beneficially performs as an in-memory broadcast or reduction operation, thereby freeing the processor circuitry 120 to perform other operations during the pendency of the in-memory array operation. In embodiments, the DMA control circuitry 110 may include circuitry disposed on a semiconductor die included in a system-on-chip (SoC) or on a semiconductor chiplet included in a multi-chip module (MCM). In other embodiments, memory management unit (MMU) circuitry may provide all or a portion of the DMA control circuitry 110. In embodiments, a system bus 170 communicatively couples the DMA control circuitry 110, the processor circuitry 120, and the memory circuitry 130.

The processor circuitry 120 may include any number and/or combination of currently available and/or future developed electronic components, semiconductor devices, and/or logic elements capable of executing instructions that include but are not limited to operating system and application instructions. The processor circuitry 120 may include any of a wide variety of commercially available processors, including without limitation, an AMD® Athlon®, Duron® or Opteron® processor; an ARM® application, embedded and secure processors; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®. Pentium®, Xeon® or XScale® processor. Further, the processor circuitry 120 may include a multi-core processor (whether the multiple cores coexist on the same or separate dies), and/or a multi-processor architecture of some other variety by which multiple physically separate processors are in some way communicatively coupled.

The system memory circuitry 130 may include any number and/or combination of currently available and/or future developed electronic components, semiconductor devices, and/or logic elements capable of storing or otherwise retaining information and/or data. The system memory circuitry 130 may be based on any of wide variety of information storage technologies, possibly including volatile technologies requiring the uninterrupted provision of electric power, and possibly including technologies entailing the use of machine-readable storage media that may be removable, or that may not be removable. Thus, the system memory circuitry 130 may include any of a wide variety of types of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although the system memory circuitry 130 is depicted as a single block in FIG. 1, the system memory circuitry 130 may include multiple storage devices that may be based on differing storage technologies.

Figure 2:
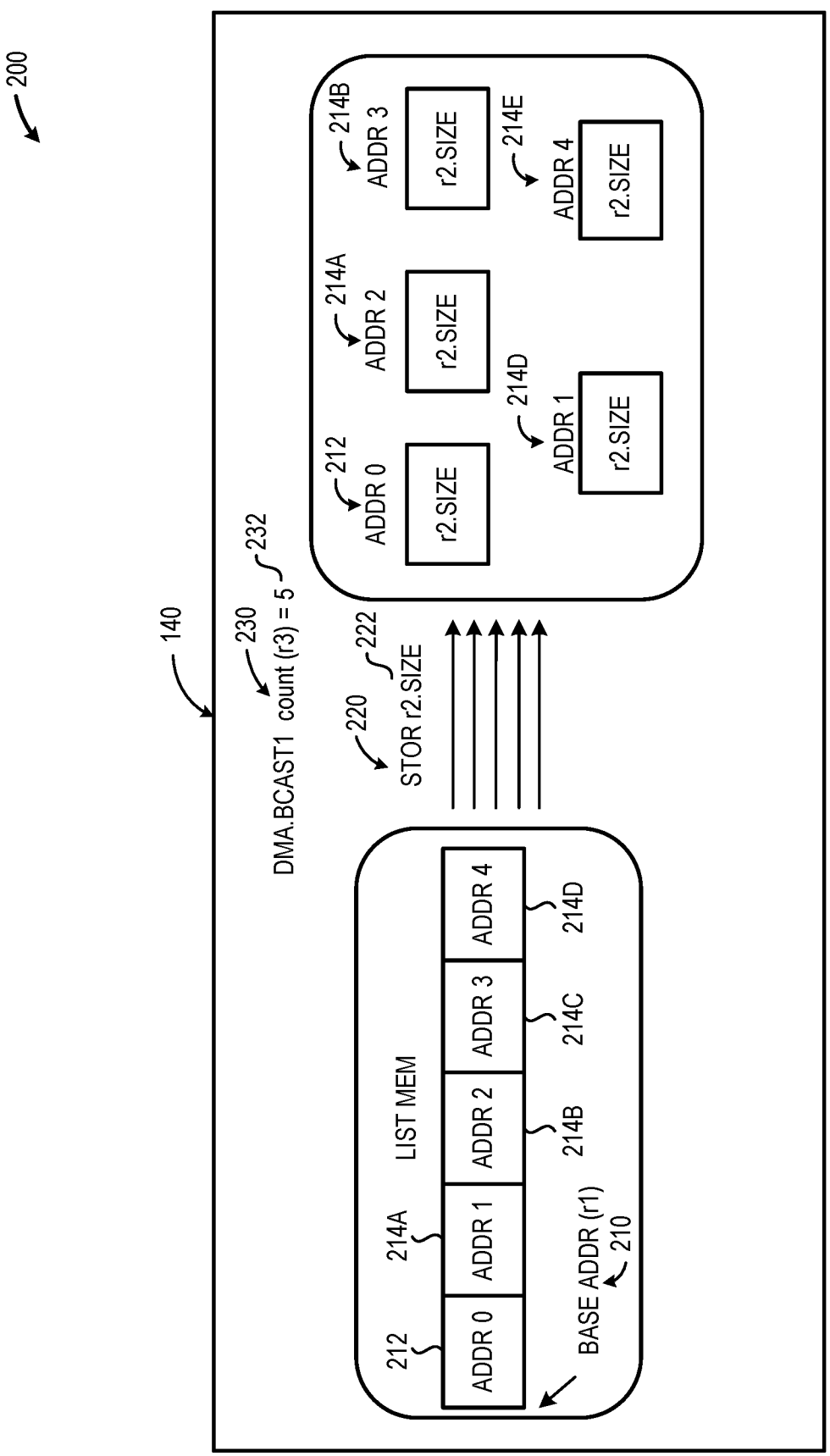
FIG. 2 is a schematic diagram of an example DMA data broadcast instruction, in accordance with at least one embodiment described herein.

FIG. 2 is a schematic diagram of an example DMA data broadcast instruction 140, in accordance with at least one embodiment described herein. In the embodiment depicted in FIG. 2, the DMA data broadcast instruction 140 includes a first field that contains information 210 representative of a base address 212. In addition, the first field may contain data representative of a list of one or more physical memory addresses 214A-214n. The DMA data broadcast instruction 140 further includes a second field that contains information 220 representative of the broadcast data value 222 used to populate the addresses 212 and 214A-214n in the memory circuitry 130. The DMA data broadcast instruction 140 further includes a third field containing information 230 representative of the number or count of physical addresses in the memory circuitry 130 to store the data value 222. At the conclusion of the data broadcast instruction, the physical addresses 212 and 214A-214n each contain the broadcast data value 222.

Although not depicted in FIG. 2, in embodiments, the DMA data broadcast instruction 140 may include a DMA_Type field that contains information and/or data indicative of a conditional data broadcast instruction. In such embodiments, the DMA broadcast instruction 140 may include a second additional field containing information representative of one or more defined values used by the conditional DMA data broadcast instruction 140. In embodiments, the DMA control circuitry 110 may use the one or more defined values to conditionally or selectively replace the current value in some or all of the addresses 212, 214A-214n in the memory circuitry 130. In embodiments, the DMA control circuitry 110 may compare the one or more defined values with the current data or current information stored at each of at least some of the addresses 212, 214A-214n. In some embodiments, if the current data or current information stored at each of at least some of the addresses 212, 214A-214n is the same as or matches all or a portion of one or more defined values, the DMA control circuitry 110 replaces the current data or information at the respective address with the data value 222. In some embodiments, if the current data or current information stored at each of at least some of the addresses 212, 214A-214n differs from all or a portion of the one or more defined values, the DMA control circuitry 110 replaces the current data or information at the respective address with the data value 222.

Although not depicted in FIG. 2, in embodiments, rather than including a list of addresses in the memory circuitry 130, the DMA broadcast instruction 140 may instead include a field containing information representative of a base address in the memory circuitry 130 and data representative of an offset value from the base address that, in conjunction with the data representative of number or count of addresses in the memory circuitry 130 to store the data value 222, may be used by the DMA control circuitry 110 to determine each successive address in the memory circuitry 130 to store the data value 222.

Figure 3:
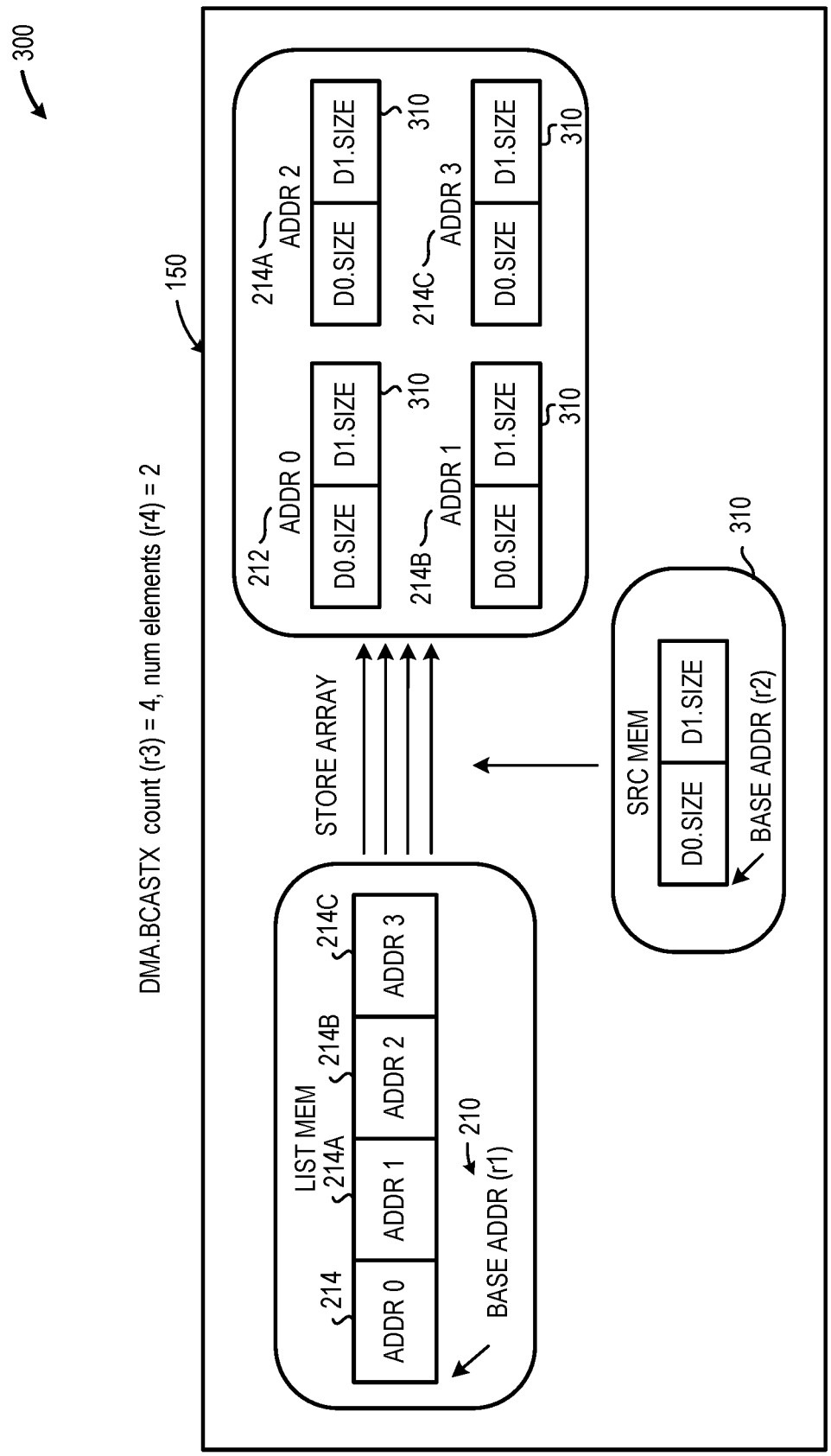
FIG. 3 is a schematic diagram of an example DMA array broadcast instruction, in accordance with at least one embodiment described herein.

FIG. 3 is a schematic diagram of an example DMA array broadcast instruction 150, in accordance with at least one embodiment described herein. In the embodiment depicted in FIG. 3, the DMA array broadcast instruction 150 includes a first field containing information 210 representative of a base address 212. In addition, the first field may contain data representative of a list of one or more physical memory addresses 214A-214n. The DMA array broadcast instruction 150 includes a second field 310 containing information 312 representative of a base address in the memory circuitry of the data array and information 314 representative of the size of the data array. The DMA array broadcast instruction 150 includes a third field 310 that contains information 230 representative of the number or count of addresses in the memory circuitry 130 to store the data array 310. The DMA array broadcast instruction 150 includes a fourth field 320 that contains information 322 representative of the number or count of items included in the data array 310 to copy to each of the destination addresses in the memory circuitry 130. At the conclusion of the DMA array broadcast instruction, the addresses 212 and 214A-214n each contain the broadcast array data value 310.

In embodiments, the DMA array broadcast instruction may additionally include a DMA_Type field that contains information and/or data indicative of an element-wise operation requested at the destination addresses 212 and 214A-214n in memory circuitry 130.

Although not depicted in FIG. 3, in embodiments, rather than including a list of addresses in the memory circuitry 130, the DMA array broadcast instruction 150 may instead include information and/or data in the DMA broadcast modifier field indicative of a base address plus address offset format DMA array broadcast instruction 150. In such instances, the first field in the DMA array broadcast instruction may include information and/or data representative of a base address in the memory circuitry 130 and information and/or data representative of an offset value from the base address that, in conjunction with the data 230 representative of number or count of addresses in the memory circuitry 130 to store the array data value 310, may be used by the DMA control circuitry 110 to determine each successive address in the memory circuitry 130 to store the array data value 310.

Figure 4:
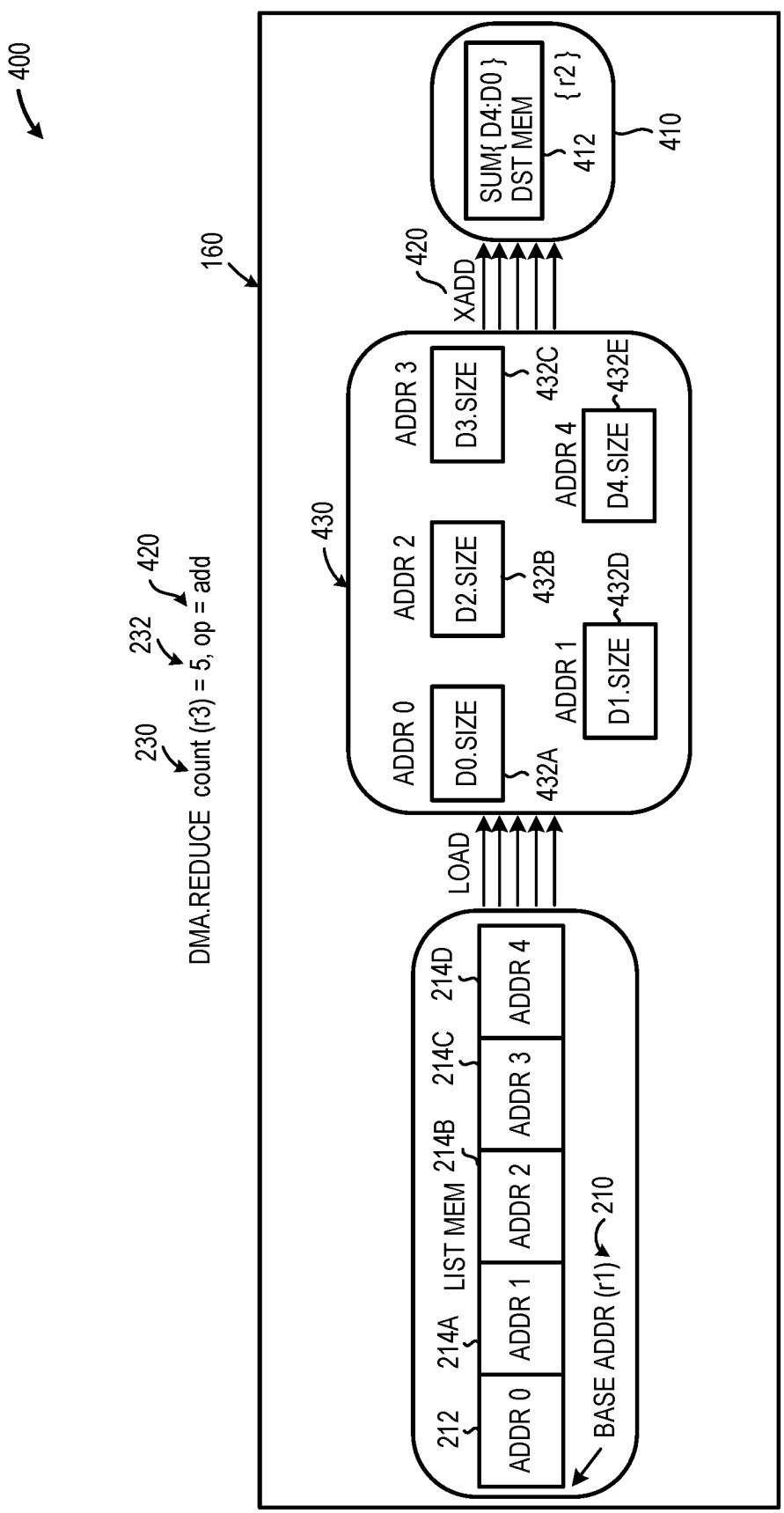
FIG. 4 is a schematic diagram of an example DMA reduce broadcast instruction, in accordance with at least one embodiment described herein.

FIG. 4 is a schematic diagram of an example DMA reduce broadcast instruction 160, in accordance with at least one embodiment described herein. In the embodiment depicted in FIG. 4, the DMA reduce broadcast instruction 160 includes a first field containing information 210 representative of a base address 212 containing data used in the reduction operation. In addition, the first field may contain data representative of a list of one or more physical memory addresses 214A-214n containing data used in the reduction operation. The DMA array reduce instruction 160 includes a second field 410 containing information 412 representative of an address in the memory circuitry 130 to receive the resultant data from the reduce operation. The DMA array reduce instruction 160 includes a third field 310 that contains information 230 representative of the number or count of addresses in the memory circuitry 130 to provide data to the reduce operation. The DMA array reduction instruction 160 includes a DMA_Type field that contains information and/or data indicative of the type of operation to perform using the data retrieved from addresses 212 and 214A-214n. At the conclusion of the DMA array reduce instruction, the address 412 contains data representative of the result generated by the DMA array reduction operation.

Although not depicted in FIG. 4, in embodiments, rather than including a list of addresses in the memory circuitry 130, the DMA array reduction instruction 160 may instead include information and/or data indicative of a base plus offset memory address format to provide the addresses of the data included in the array reduction operation. In such instances, the first field in the DMA array reduction instruction 160 may include information and/or data representative of a base address in the memory circuitry 130 and information and/or data representative of an offset value from the base address used by the DMA control circuitry 110 to determine each successive address in the memory circuitry 130 from which to retrieve the data used in the array reduction operation.

Each of the DMA broadcast instruction 140, the DMA array broadcast instruction 150, and the DMA array reduction instruction 160 may include a DMA_Type field that contains information and/or data associated with the operation of the broadcast or reduction operation being performed. Although the DMA_Type field may have any length, in at least some embodiments, the DMA_Type field may include a 15-bit field. In at least one embodiment, the DMA_Type field may include the following information and/or data:

TABLE 1

DMA_Type Field Components

| Size | Function |
|---|---|
| 1 Bit | Base + Offset Address Format Indicator |
| 1 Bit | Pack/Unpack data |
| 1 Bit | Offset pointer size (32 bit/64 bit) |
| 1 Bit | Offset pointer type (signed/unsigned) |
| 1 Bit | Complement incoming value from source |
| 1 Bit | Complement existing value |
| 4 Bits | Reduction operation encoding |
| 2 Bits | Operand type (integer, floating, unsigned) |
| 3 Bits | Operand to perform at destination address |

Figure 5:
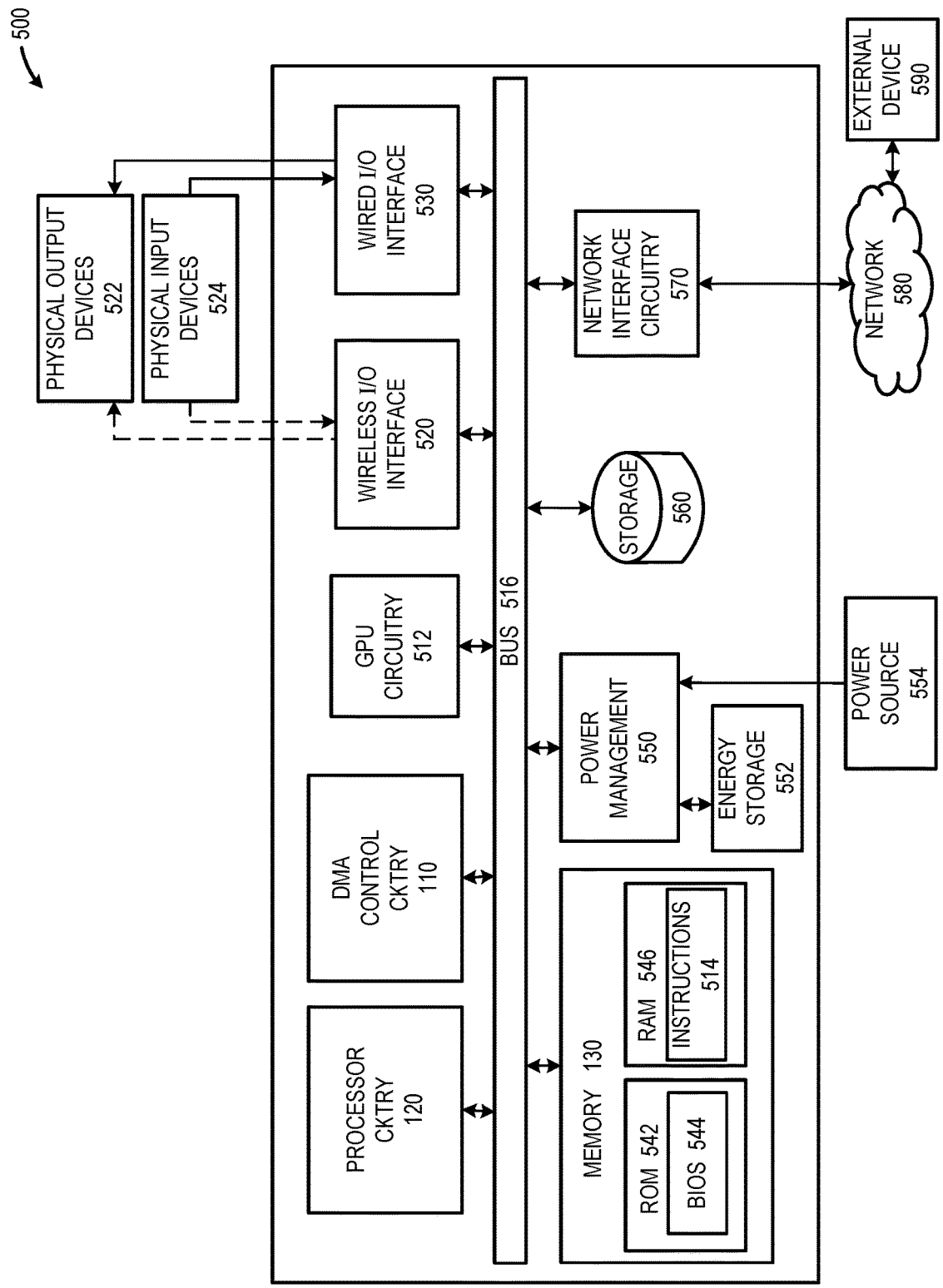
FIG. 5 is a schematic diagram of an illustrative electronic, processor-based, device that includes processor circuitry, such as a central processing unit (CPU) or multi-chip module (MCM), and DMA control circuitry, in accordance with at least one embodiment described herein.

FIG. 5 is a schematic diagram of an illustrative electronic, processor-based, device 500 that includes processor circuitry 120, such as a central processing unit (CPU) or multi-chip module (MCM), and DMA control circuitry 110, in accordance with at least one embodiment described herein. The processor-based device 500 may additionally include graphical processing unit (GPU) circuitry 512. The processor-based device 500 may additionally include one or more of the following: a wireless input/output (I/O) interface 520, a wired I/O interface 530, system memory 540, power management circuitry 550, a non-transitory storage device 560, and a network interface 570 used to communicatively couple the processor-based device 500 to one or more external devices (e.g., a cloud-based server) 590 via one or more networks 580. The following discussion provides a brief, general description of the components forming the illustrative processor-based device 500. Example, non-limiting processor-based devices 500 may include, but are not limited to: autonomous motor vehicles, semi-autonomous motor vehicles, manually controlled motor vehicles, smartphones, wearable computers, portable computing devices, handheld computing devices, desktop computing devices, blade server devices, workstations, and similar.

Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 120 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 500 includes a bus or similar communications link 516 that communicably couples and facilitates the exchange of information and/or data between various system components including the processor circuitry 120, the graphics processor circuitry 512, one or more wireless I/O interfaces 520, one or more wired I/O interfaces 530, the system memory 540, one or more storage devices 560, and/or the network interface circuitry 570. The processor-based device 500 may be referred to in the singular herein, but this is not intended to limit the embodiments to a single processor-based device 500, since in certain embodiments, there may be more than one processor-based device 500 that incorporates, includes, or contains any number of communicably coupled, collocated, or remote networked circuits or devices.

The processor circuitry 120 may include any number, type, or combination of currently available or future developed devices capable of executing machine-readable instruction sets. The processor circuitry 150 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 5 are of conventional design. Consequently, such blocks need not be described in further detail herein, as they will be understood by those skilled in the relevant art. The bus 516 that interconnects at least some of the components of the processor-based device 500 may employ any currently available or future developed serial or parallel bus structures or architectures.

The system memory 130 may include read-only memory ("ROM") 542 and random access memory ("RAM") 546. A portion of the ROM 542 may be used to store or otherwise retain a basic input/output system ("BIOS") 544. The BIOS 544 provides basic functionality to the processor-based device 500, for example by causing the processor circuitry 120 to load and/or execute one or more machine-readable instruction sets 514. In embodiments, at least some of the one or more machine-readable instruction sets 514 cause at least a portion of the processor circuitry 120 to provide, create, produce, transition, and/or function as a dedicated, specific, and particular machine.

The processor-based device 500 may include at least one wireless input/output (I/O) interface 520. The at least one wireless I/O interface 520 may be communicably coupled to one or more physical output devices 522 (tactile devices, video displays, audio output devices, hardcopy output devices, etc.). The at least one wireless I/O interface 520 may communicably couple to one or more physical input devices 524 (pointing devices, touchscreens, keyboards, tactile devices, etc.). The at least one wireless I/O interface 520 may include any currently available or future developed wireless I/O interface. Example wireless I/O interfaces include, but are not limited to: BLUETOOTH®, near field communication (NFC), and similar.

The processor-based device 500 may include one or more wired input/output (I/O) interfaces 630. The at least one wired I/O interface 630 may be communicably coupled to one or more physical output devices 522 (tactile devices, video displays, audio output devices, hardcopy output devices, etc.). The at least one wired I/O interface 530 may be communicably coupled to one or more physical input devices 524 (pointing devices, touchscreens, keyboards, tactile devices, etc.). The wired I/O interface 530 may include any currently available or future developed I/O interface. Example wired I/O interfaces include but are not limited to: universal serial bus (USB), IEEE 1394 ("FireWire"), and similar.

The processor-based device 500 may include one or more communicably coupled, non-transitory, data storage devices 560. The data storage devices 560 may include one or more hard disk drives (HDDs) and/or one or more solid-state storage devices (SSDs). The one or more data storage devices 560 may include any current or future developed storage appliances, network storage devices, and/or systems. Non-limiting examples of such data storage devices 560 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 560 may include one or more removable storage devices, such as one or more flash drives, flash memories, flash storage units, or similar appliances or devices capable of communicable coupling to and decoupling from the processor-based device 500.

The one or more data storage devices 560 may include interfaces or controllers (not shown) communicatively coupling the respective storage device or system to the bus 516. The one or more data storage devices 560 may store, retain, or otherwise contain machine-readable instruction sets, data structures, program modules, data stores, databases, logical structures, and/or other data useful to the processor circuitry 120 and/or graphics processor circuitry 512 and/or one or more applications executed on or by the processor circuitry 120 and/or graphics processor circuitry 512. In some instances, one or more data storage devices 560 may be communicably coupled to the processor circuitry 120, for example via the bus 516 or via one or more wired communications interfaces 530 (e.g., Universal Serial Bus or USB); one or more wireless communications interfaces 520 (e.g., Bluetooth®, Near Field Communication or NFC); and/or one or more network interfaces 570 (IEEE 802.3 or Ethernet, IEEE 802.11, or WiFi®, etc.).

Machine-readable instruction sets 514 and other programs, applications, logic sets, and/or modules may be stored in whole or in part in the system memory 130. Such instruction sets 514 may be transferred, in whole or in part, from the one or more data storage devices 560. The instruction sets 514 may be loaded, stored, or otherwise retained in system memory 130, in whole or in part, during execution by the processor circuitry 120 and/or graphics processor circuitry 512.

The processor-based device 500 may include power management circuitry 550 that controls one or more operational aspects of the energy storage device 552. In embodiments, the energy storage device 552 may include one or more primary (i.e., non-rechargeable) or secondary (i.e., rechargeable) batteries or similar energy storage devices. In embodiments, the energy storage device 552 may include one or more supercapacitors or ultracapacitors. In embodiments, the power management circuitry 550 may alter, adjust, or control the flow of energy from an external power source 554 to the energy storage device 552 and/or to the processor-based device 500. The power source 554 may include, but is not limited to, a solar power system, a commercial electric grid, a portable generator, an external energy storage device, or any combination thereof.

For convenience, the processor circuitry 120, the GPU circuitry 512, the wireless I/O interface 520, the wired I/O interface 530, the system memory 130, the power management circuitry 550, the storage device 560, and the network interface 570 are illustrated as communicatively coupled to each other via the bus 516, thereby providing connectivity between the above-described components. In alternative embodiments, the above-described components may be communicatively coupled in a different manner than illustrated in FIG. 5. For example, one or more of the above-described components may be directly coupled to other components, or may be coupled to each other, via one or more intermediary components (not shown). In another example, one or more of the above-described components may be integrated into the processor circuitry 120 and/or the graphics processor circuitry 512. In some embodiments, all or a portion of the bus 516 may be omitted and the components are coupled directly to each other using suitable wired or wireless connections.

Figure 6:
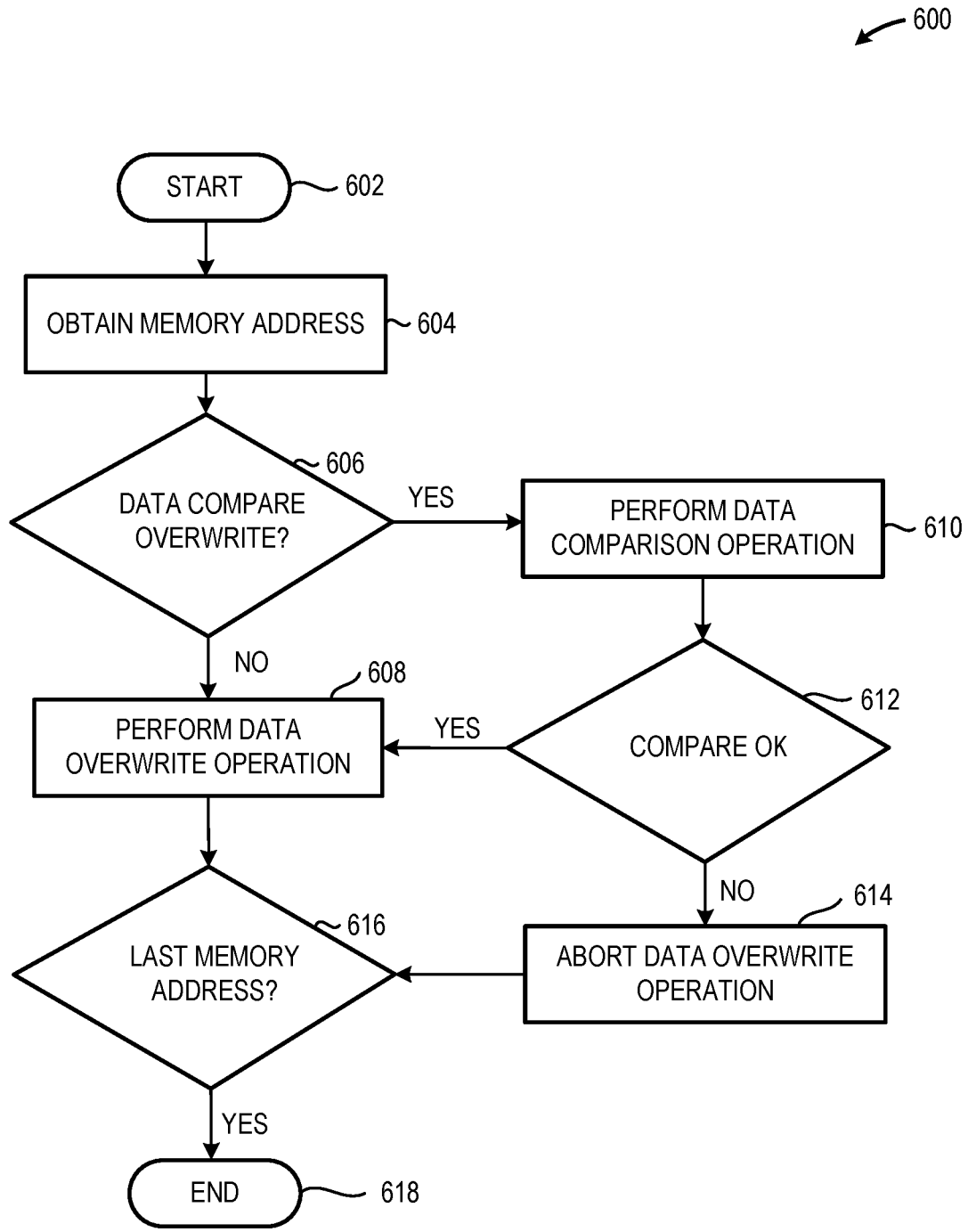
FIG. 6 is a high-level logic flow diagram of an illustrative data broadcast method for broadcasting data such as an individual value or an array of values to a plurality of memory addresses within memory circuitry, in accordance with at least one embodiment described herein.

FIG. 6 is a high-level logic flow diagram of an illustrative data broadcast method 600 for broadcasting data such as an individual value or an array of values to a plurality of memory addresses within memory circuitry 130, in accordance with at least one embodiment described herein. In embodiments, the ISA executed by the DMA control circuitry 110 includes a broadcast instruction that enables the DMA control circuitry 110 to communicate a value, such as a single data value or an array of data values, from a source address in memory circuitry 130 to each of a plurality addresses in memory circuitry 130 with minimal impact on processor circuitry 120. The method 600 commences at 602.

At 604, the DMA control circuitry 110 obtains one or more destination addresses in memory circuitry 130 to copy or otherwise communicate data. In embodiments, the plurality of destination addresses includes a list that contains a base address 212 and a plurality of other addresses 214A-214n in the memory circuitry 110. In other embodiments, the plurality of destination addresses includes a base address 212 and an offset value used to obtain each remaining destination address in memory circuitry 130 (e.g., base address, base address+(1*offset value), base address+(2*offset value) . . . base address+(n*offset value)).

In some embodiments, a pointer directs the DMA control circuitry 110 to an address in memory circuitry 130 that stores or otherwise retains a single data value for broadcast to the plurality of destination addresses 212 and 214A-214n. In other embodiments, a pointer directs the DMA control circuitry 110 to an address in memory circuitry 130 that stores or otherwise retains an array of data values for broadcast to the plurality of destination addresses 212 and 214A-214n.

At 606, the DMA control circuitry 110 determines whether to execute a data compare/overwrite instruction for each of the plurality of destination addresses 212 and 214A-214n. If the DMA control circuitry 110 does not execute a data compare/overwrite instruction, the method 600 continues at 608, otherwise the method 600 continues at 610.

At 608, the DMA control circuitry 110 overwrites or otherwise replaces the data at the respective destination address and the method 600 continues at 616.

At 610, the DMA control circuitry 110 executes the compare/overwrite instruction in which the DMA control circuitry 110 compares the current value at the respective destination address with the one or more defined values. Dependent on the outcome of the comparison operation, the DMA control circuitry 110 autonomously and selectively either permits the current value at the respective destination address to remain unchanged or replaces the current value at the respective destination address with the value from the source address.

In embodiments, if the current value at the respective destination address matches or is the same as at least a portion of the one or more defined values, the DMA control circuitry 110 replaces the current value at the respective destination address with the broadcast value. In other embodiments, if the current value at the respective destination address differs from at least a portion of the one or more defined values, the DMA control circuitry replaces the current value at the respective destination address with the broadcast value.

At 612, if the comparison performed at 610 indicates the DMA control circuitry 110 should replace the current value at the respective destination address with the broadcast data value, the method 600 continues at 608. If the comparison performed at 610 indicates the DMA control circuitry 110 should NOT replace the current value at the respective destination address with the broadcast data value, the method 600 continues at 614.

At 614, responsive to a determination that the current data at the respective address should NOT be overwritten or otherwise replaced, the DMA control circuitry 110 aborts the replacement of the current data at the respective destination address.

At 616, the DMA control circuitry 110 determines whether additional destination addresses exist to receive the broadcast data. Responsive to a determination that additional destination addresses should receive the broadcast data, the method 600 returns to 604. Responsive to a determination that no additional destination addresses should receive the broadcast data value, the method 600 concludes at 618.

Figure 7:
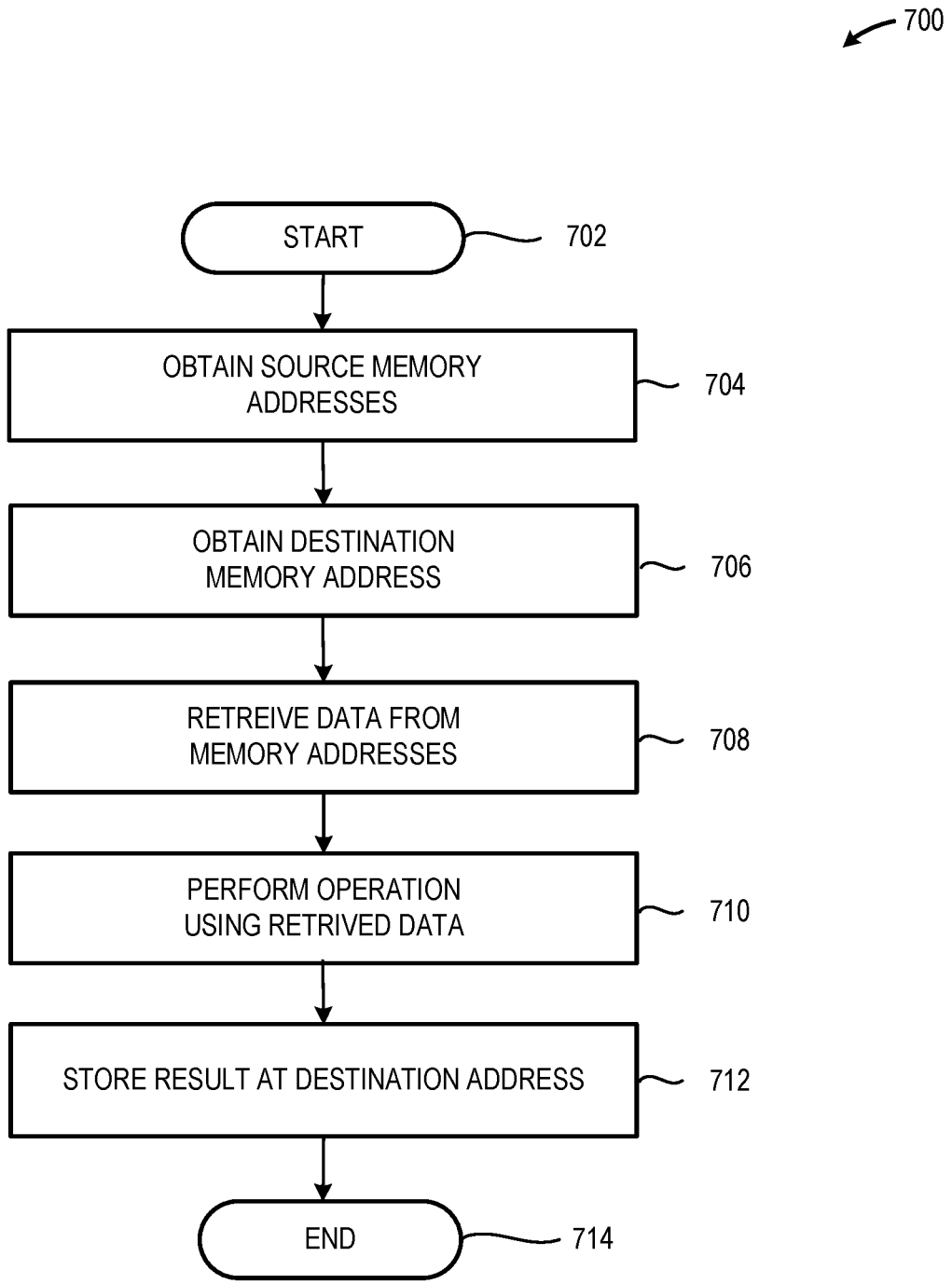
FIG. 7 is a high-level logic flow diagram of an illustrative array reduction method that includes gathering data from a plurality of physical addresses prior to performing one or more operations using the data, in accordance with at least one embodiment described herein.

FIG. 7 is a high-level logic flow diagram of an illustrative array reduction method 700 that includes gathering data from a plurality of physical addresses prior to performing one or more operations using the data, in accordance with at least one embodiment described herein. In embodiments, the DMA control circuitry 110 may perform one or more operations (e.g., one or more mathematical operations) to combine or reduce an array containing a plurality of data values (e.g., single data values or an array of data values) to a result that contains fewer data values. The method 700 commences at 702.

At 704, the DMA control circuitry 110 obtains information and/or data representative of each of a plurality of source data addresses in memory circuitry 130 that store or otherwise contain the source data values.

At 706, the DMA control circuitry 110 obtains information and/or data representative of one or more destination addresses in memory circuitry 130 to receive the resultant output of the one or more operations performed on the input data collected from the addresses identified at 704.

At 708, the DMA control circuitry 110 obtains the source data values stored or otherwise retained at each of the plurality of source data addresses identified at 704.

At 710, the DMA control circuitry 110 performs one or more operations using the source data values obtained at 708.

At 712, the DMA control circuitry 110 stores or otherwise retains the one or more output data value(s) generated at 710 in the one or more destination addresses identified at 706. The method 700 concludes at 714

The figures below detail exemplary architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
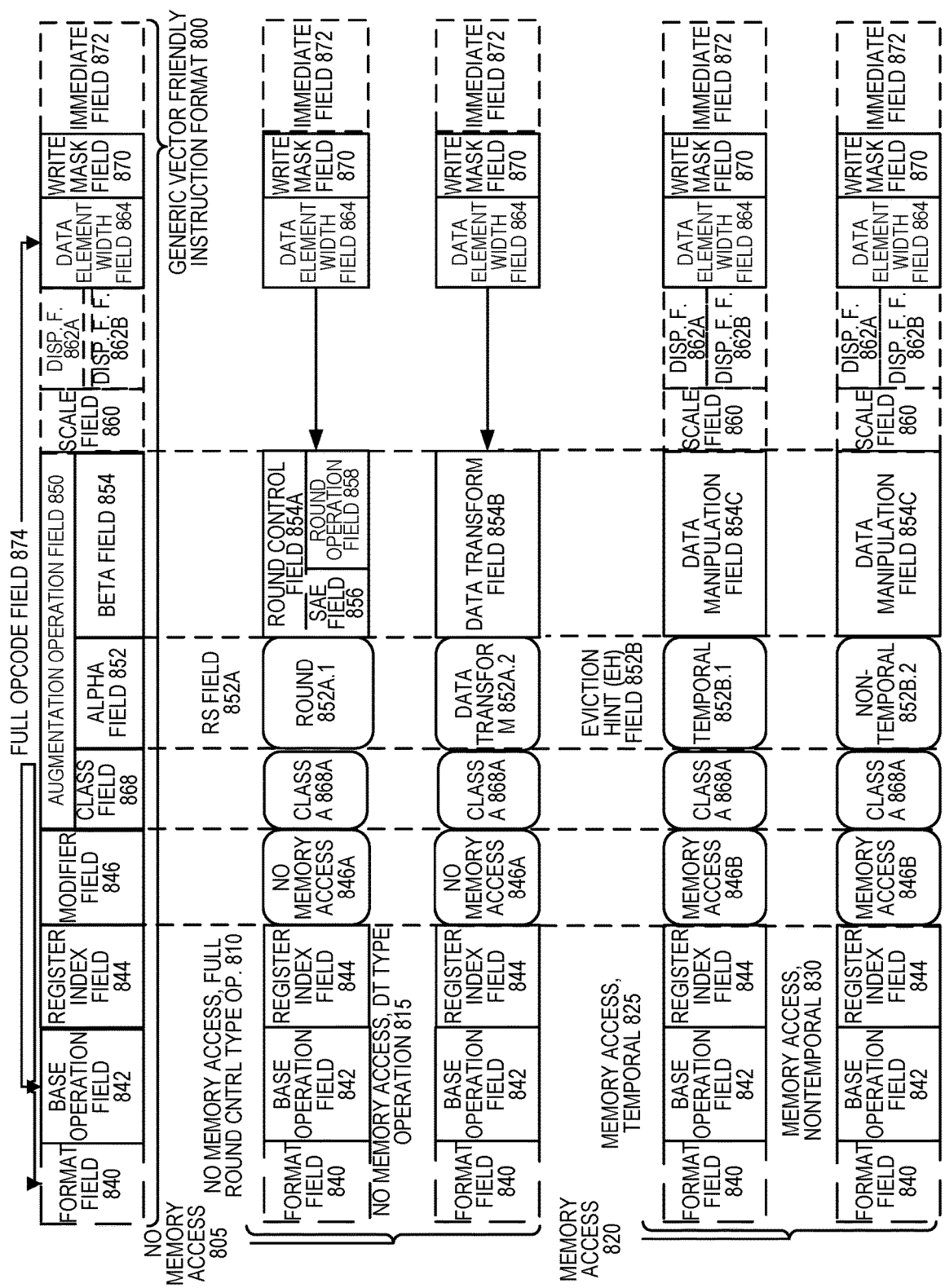
FIGS. 8A and 8B are block diagrams illustrating a generic vector friendly instruction format and instruction templates thereof according to embodiments of the invention.
Figure 8B:
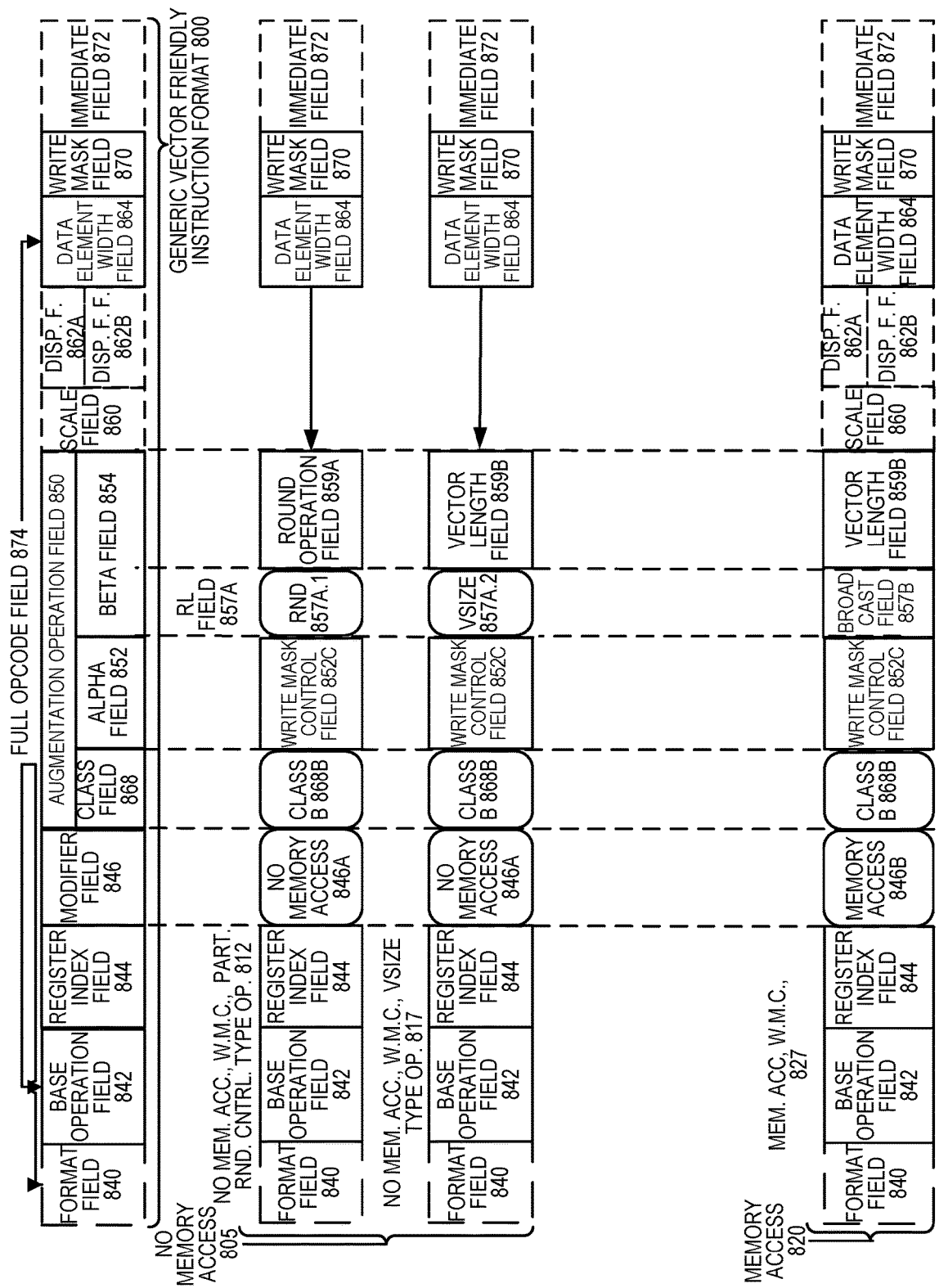

FIGS. 8A and 8B are block diagrams illustrating a generic vector friendly instruction format and instruction templates thereof according to embodiments of the invention. FIG. 8A is a block diagram illustrating a generic vector friendly instruction format and class A instruction templates thereof according to embodiments of the invention; while FIG. 8B is a block diagram illustrating the generic vector friendly instruction format and class B instruction templates thereof according to embodiments of the invention. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template. The generic vector friendly instruction format 800 includes the following fields listed below in the order illustrated in FIGS. 8A and 8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the invention, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}*index+base$).

Displacement Field 862A—its content is used as part of memory address generation (e.g., for address generation that uses $2^{scale}*index+base+displacement$).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the invention are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A and B, the contents of this field select between class A and class B instructions. In FIGS. 8A and 8B, rounded corner squares are used to indicate a specific value is present in a field (e.g., class A 868A and class B 868B for the class field 868 respectively in FIGS. 8A and 8B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access

805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments of the invention the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the invention where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the invention where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9 is a block diagram illustrating an exemplary specific vector friendly instruction format according to embodiments of the invention. FIG. 9 shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9 map are illustrated.

It should be understood that, although embodiments of the invention are described with reference to the specific vector friendly instruction format 900 in the context of the generic vector friendly instruction format 800 for illustrative purposes, the invention is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the invention is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in one embodiment of the invention).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]—R), EVEX.X bit field (EVEX byte 1, bit [6]—X), and 857BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810—this is the first part of the REX' field 810 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]—mmmm)—its content encodes an implied leading opcode byte (0F, 0F 38, or 0F 3).

Data element width field 864 (EVEX byte 2, bit [7]—W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]-U)—If EVEX.U=0, it indicates class A or EVEX.U0; if EVEX.U=1, it indicates class B or EVEX.U1.

Prefix encoding field 925 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 854 (EVEX byte 3, bits [6:4]-SSS, also known as EVEX.$s_{2-0}$, EVEX.$r_{2-0}$, EVEX.rrl, EVEX.LL0, EVEX.LLB; also illustrated with βββ)—as previously described, this field is context specific.

REX' field 810—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]-kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to one embodiment of the invention. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to one embodiment of the invention. Specifically, the register index field 844 includes the REX field 905, the REX' field 910, the MODR/

M.reg field 944, the MODR/M.r/m field 946, the VVVV field 920, xxx field 954, and the bbb field 956.

Augmentation Operation Field

Figure 9D:
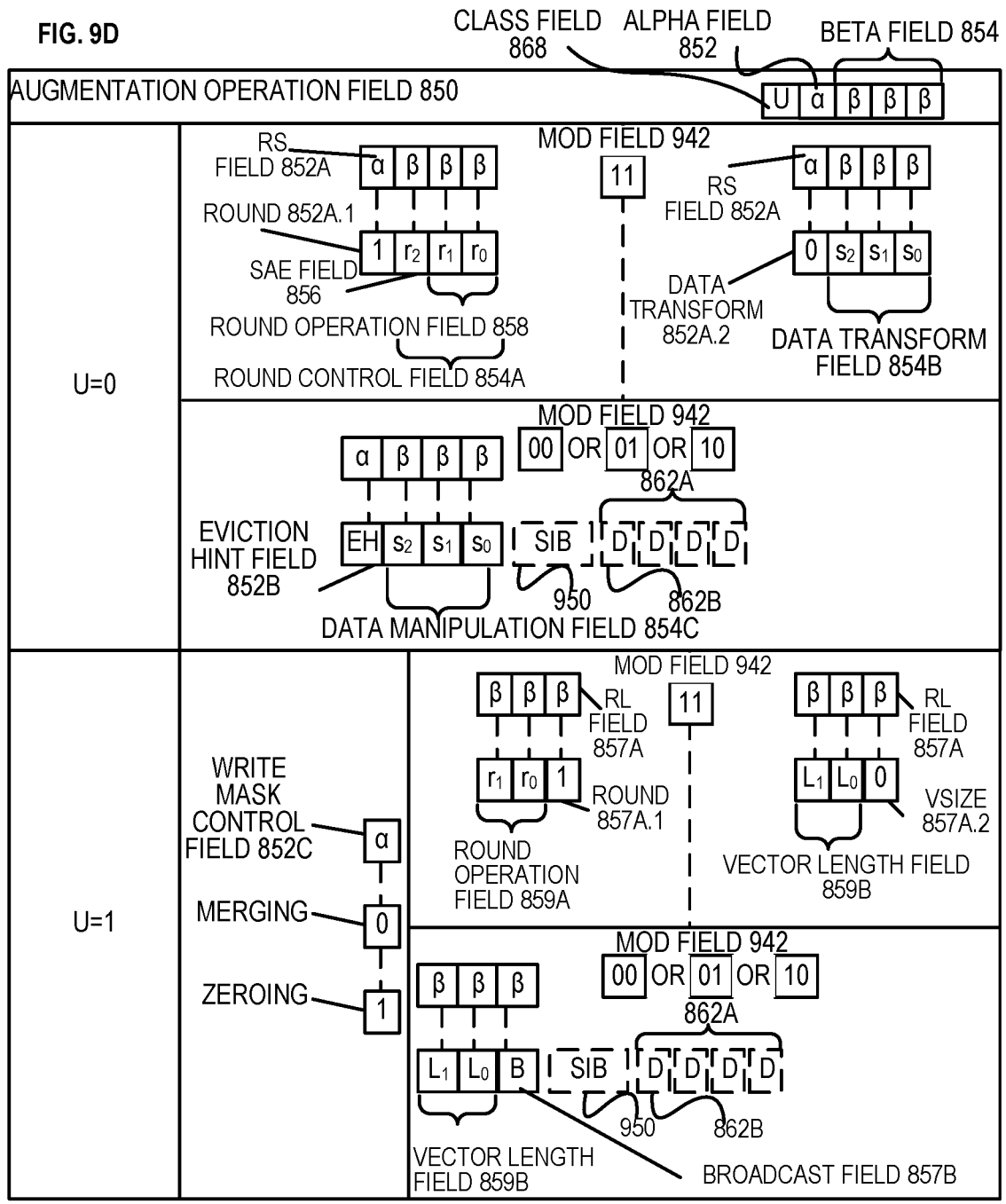

FIG. 9D is a block diagram illustrating the fields of the specific vector friendly instruction format 900 that make up the augmentation operation field 850 according to one embodiment of the invention. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]—EH) is interpreted as the rs field 852A. When the rs field 852A contains a 1 (round 852A.1), the beta field 854 (EVEX byte 3, bits [6:4]—SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]—SSS) is interpreted as a three bit data transform field 854B. When U=0 and the MOD field 942 contains 00, 01, or 10 (signifying a memory access operation), the alpha field 852 (EVEX byte 3, bit [7]—EH) is interpreted as the eviction hint (EH) field 852B and the beta field 854 (EVEX byte 3, bits [6:4]—SSS) is interpreted as a three bit data manipulation field 854C.

When U=1, the alpha field 852 (EVEX byte 3, bit [7]—EH) is interpreted as the write mask control (Z) field 852C. When U=1 and the MOD field 942 contains 11 (signifying a no memory access operation), part of the beta field 854 (EVEX byte 3, bit [4]—$S_0$) is interpreted as the RL field 857A; when it contains a 1 (round 857A.1) the rest of the beta field 854 (EVEX byte 3, bit [6-5]—$S_{2-1}$) is interpreted as the round operation field 859A, while when the RL field 857A contains a 0 (VSIZE 857.A2) the rest of the beta field 854 (EVEX byte 3, bit [6-5]—$S_{2-1}$) is interpreted as the vector length field 859B (EVEX byte 3, bit [6-5]—$L_{1-0}$). When U=1 and the MOD field 942 contains 00, 01, or 10 (signifying a memory access operation), the beta field 854 (EVEX byte 3, bits [6:4]—SSS) is interpreted as the vector length field 859B (EVEX byte 3, bit [6-5]—$L_{1-0}$) and the broadcast field 857B (EVEX byte 3, bit [4]—B).

Exemplary Register Architecture

Figure 10:
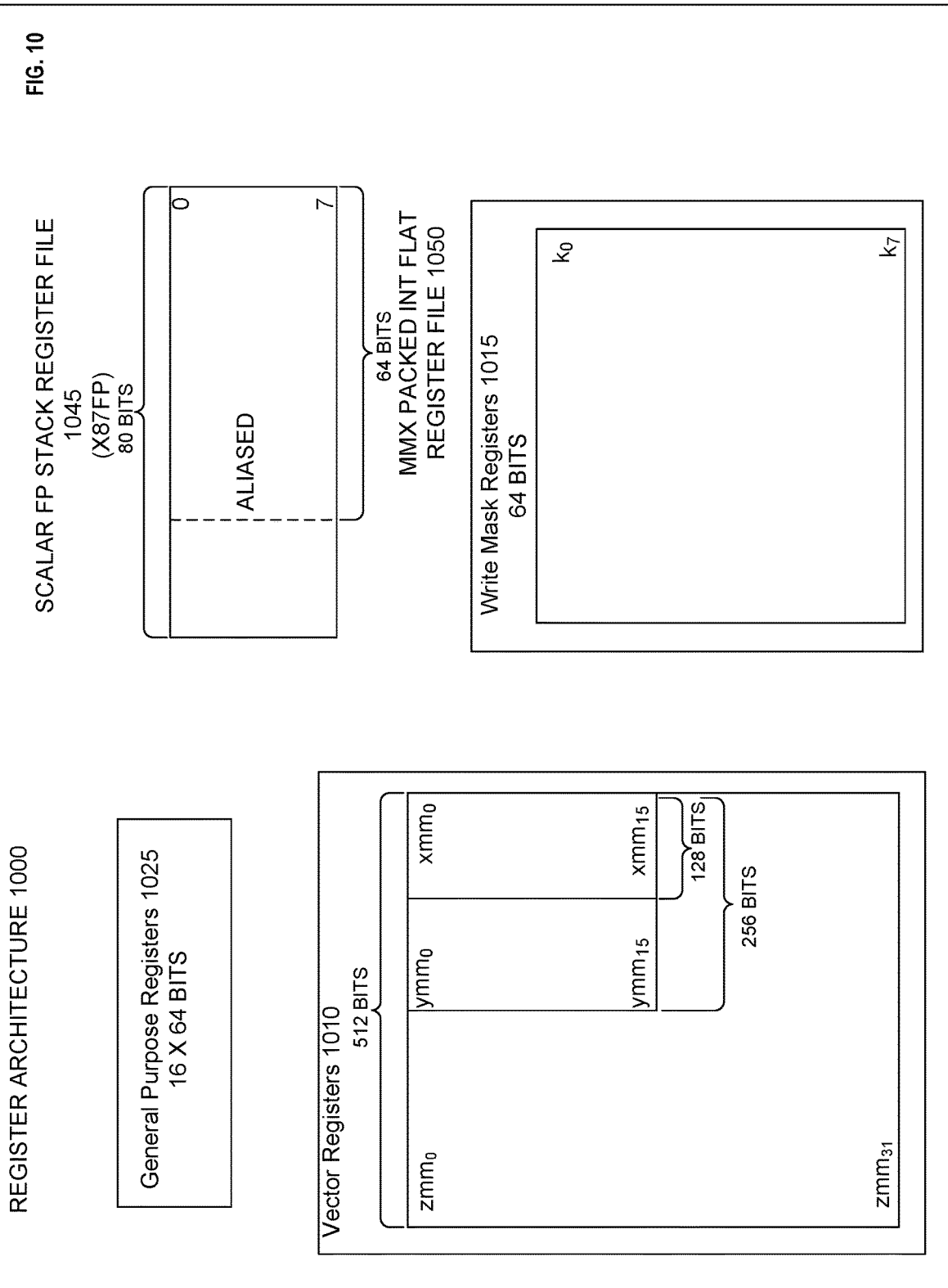
FIG. 10 is a block diagram of a register architecture according to one embodiment of the invention.

FIG. 10 is a block diagram of a register architecture 1000 according to one embodiment of the invention. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
| --- | --- | --- | --- |
| Instruction Templates that do not include | A (FIG. 8A; U = 0) | 810, 815, 825, 830 | zmm registers (the vector length is 64 byte) |
| the vector length field 859B | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A and 11B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12B:
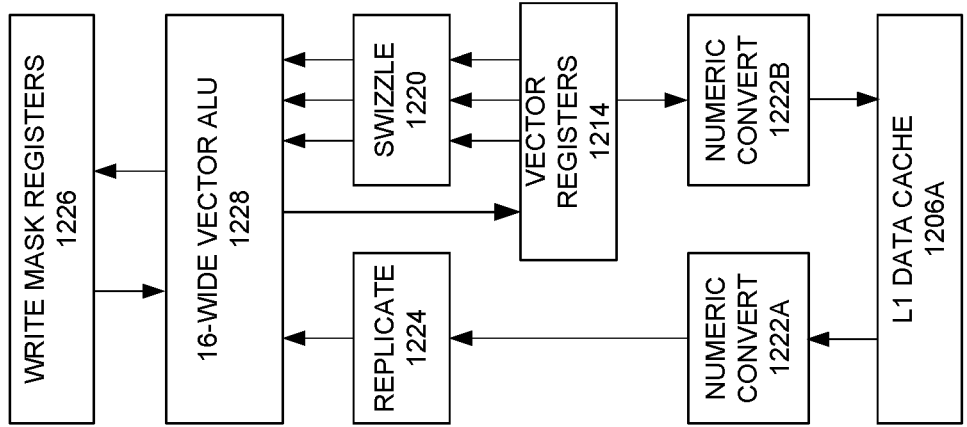
FIGS. 12A and 12B illustrate a block diagram of a more specific exemplary in-order core architecture, which core would be one of several logic blocks (including other cores of the same type and/or different types) in a chip.
Figure 12A:
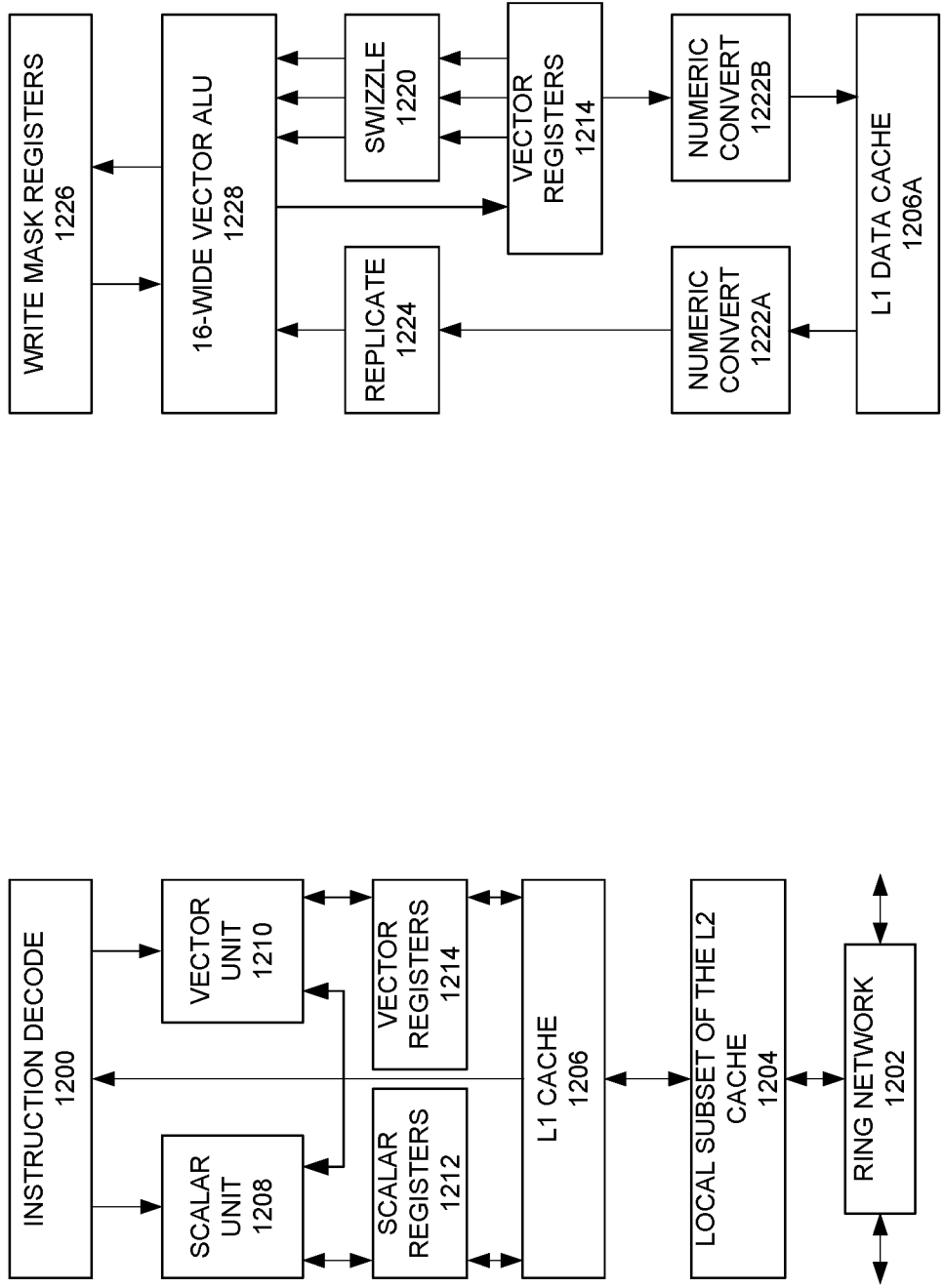

FIGS. 12A and 12B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
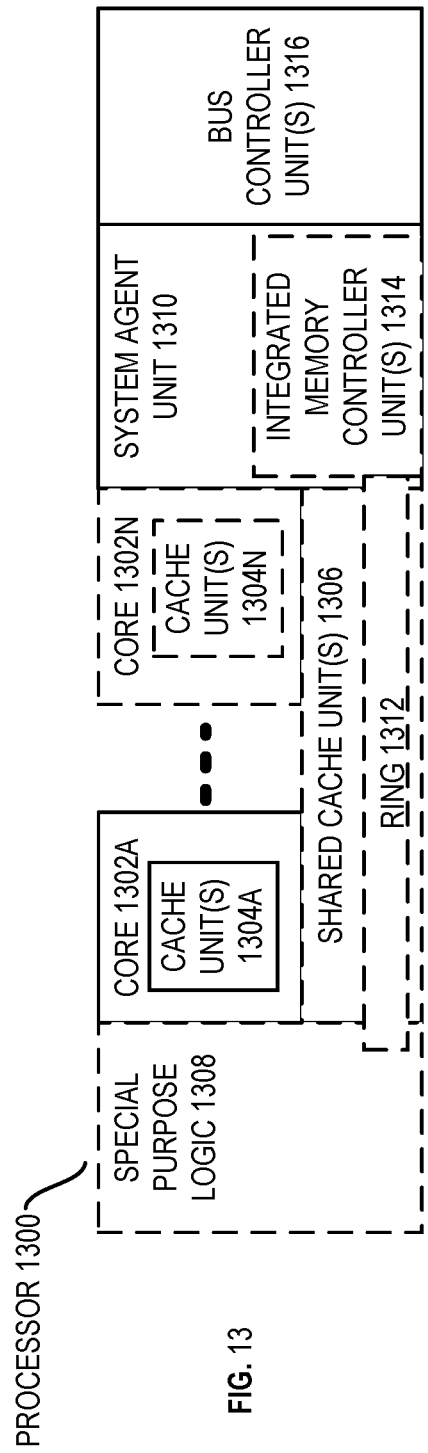
FIG. 13 is a block diagram of a processor that may have more than one core, may have an integrated memory controller, and may have integrated graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302-A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14, 15, 16, and 17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
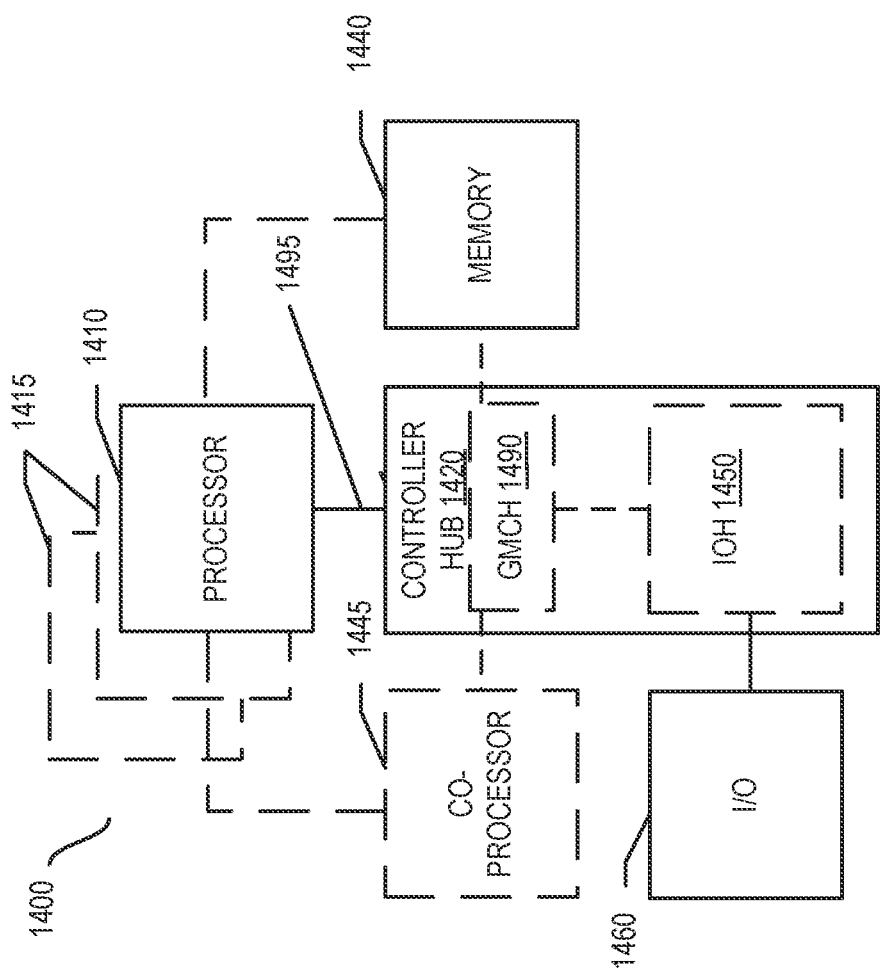
FIGS. 14, 15, 16, and 17 are block diagrams of exemplary computer architectures.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 is couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
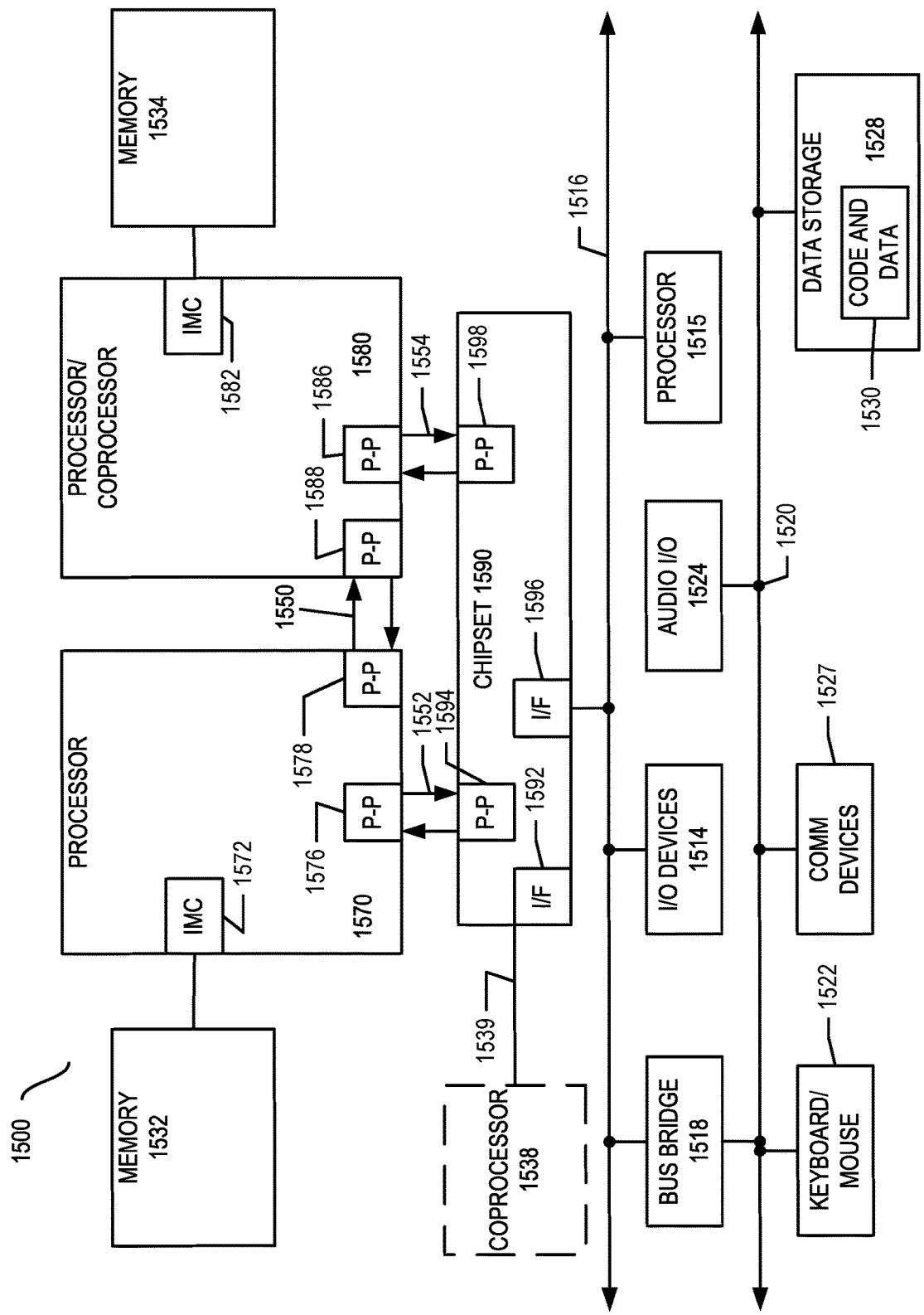

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
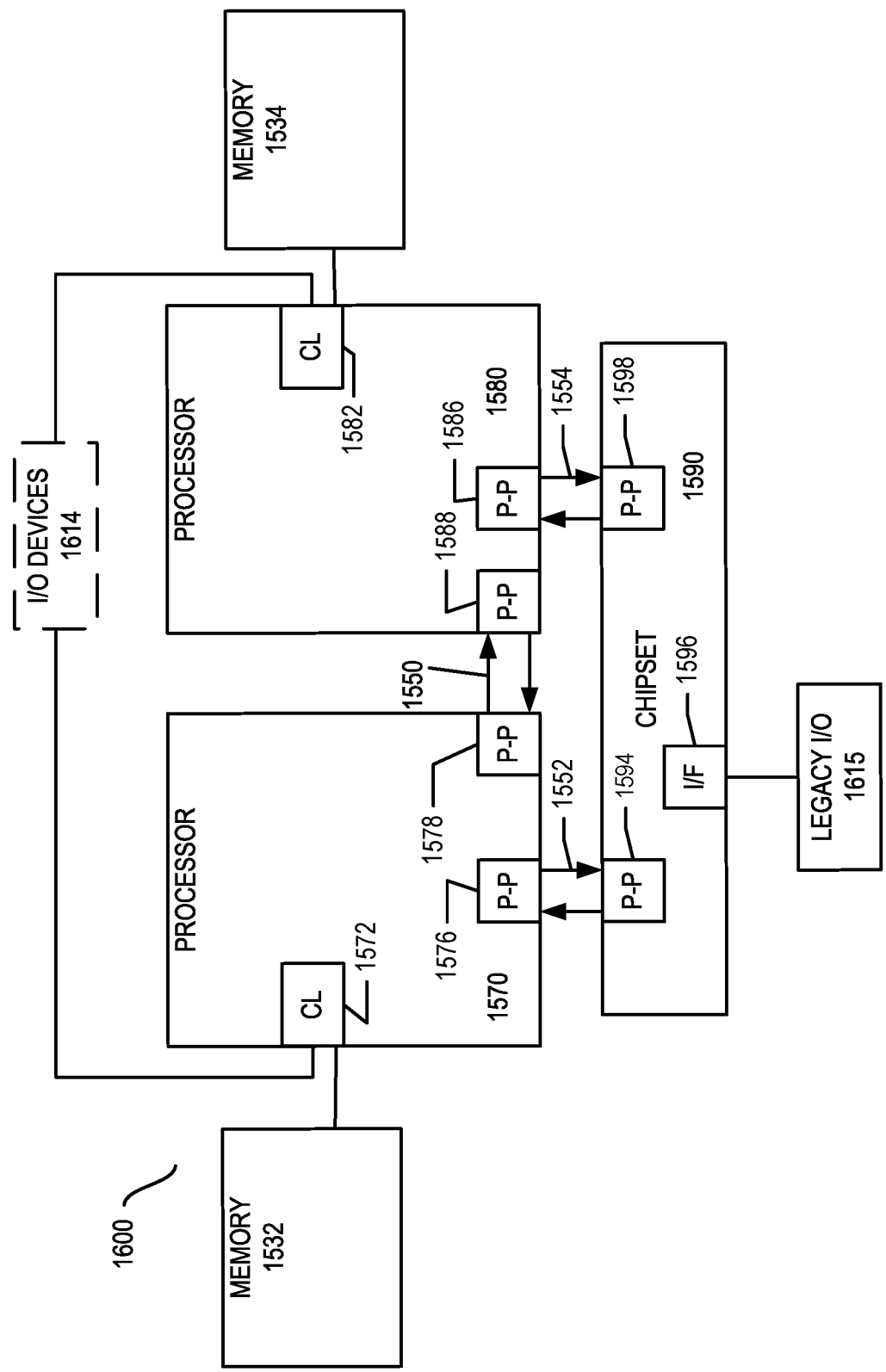

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and VO control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
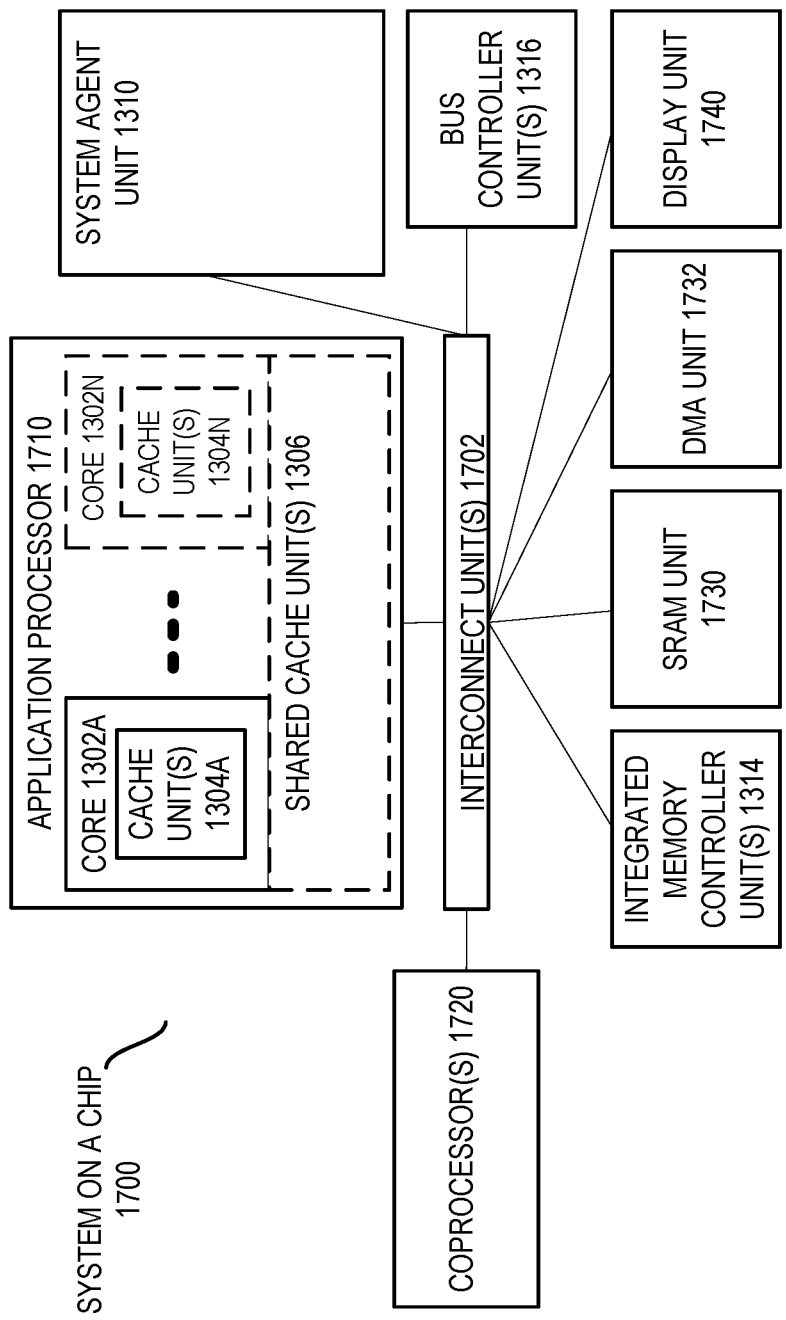

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 202A-N and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
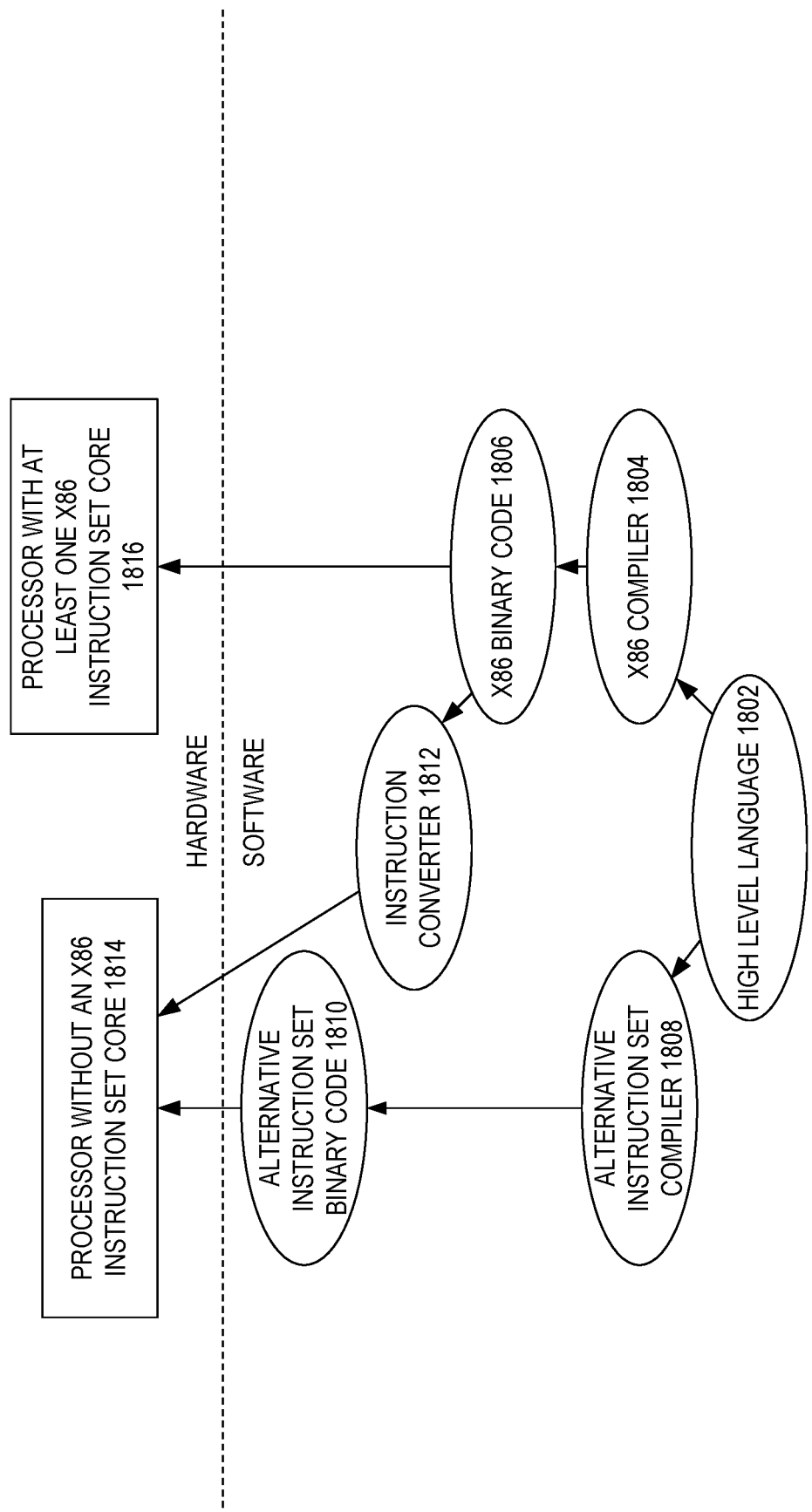
FIG. 18 is a block diagram contrasting the use of a software instruction converter to convert binary instructions in a source instruction set to binary instructions in a target instruction set according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

While FIGS. 6 and 7 illustrate various operations according to one or more embodiments, it is to be understood that not all of the operations depicted in FIGS. 6 and 7 are necessary for other embodiments. Indeed, it is fully contemplated herein that in other embodiments of the present disclosure, the operations depicted in FIGS. 6 and 7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The present disclosure is directed to systems and methods of performing one or more broadcast or reduction operations using direct memory access (DMA) control circuitry. The DMA control circuitry executes a modified instruction set architecture (ISA) that facilitates the broadcast distribution of data to a plurality of destination addresses in system memory circuitry. The broadcast instruction may include broadcast of a single data value to each destination address. The broadcast instruction may include broadcast of a data array to each destination address. The DMA control circuitry may also execute a reduction instruction that facilitates the retrieval of data from a plurality of source addresses in system memory and performing one or more operations using the retrieved data. Since the DMA control circuitry, rather than the processor circuitry performs the broadcast and reduction operations, system speed and efficiency is beneficially enhanced.

The following examples pertain to further embodiments. The following examples of the present disclosure may comprise subject material such as at least one device, a method, at least one machine-readable medium for performing one or more broadcast or reduction operations using direct memory access (DMA) control circuitry.

According to example 1, there is provided a direct memory access (DMA) system. The system may include: DMA control circuitry coupled to memory circuitry, the DMA control circuitry to execute at least one of: a data broadcast instruction, an array broadcast instruction, or an array reduction instruction: wherein, upon execution of the data broadcast instruction, the DMA control circuitry to: causes a data broadcast operation of a first data value to each of a plurality of memory addresses that begin at a base memory address location included in the data broadcast instruction and increment by a defined memory address offset also included in the data broadcast instruction; wherein, upon execution of the array broadcast instruction, the DMA control circuitry to: cause an array broadcast operation of an array that includes a defined number of elements to each of a plurality of memory addresses that begin at a base memory address location included in the array broadcast instruction and increment by a defined memory address offset also included in the array broadcast instruction; and wherein, upon execution of the array reduction instruction, the DMA control circuitry to: perform one or more operations to generate an output value using respective values stored at each of a plurality of memory address locations, the plurality of memory address locations including a base memory address location included in the array reduction instruction and a defined memory address offset included in the array reduction instruction.

Example 2 may include elements of example 1 and the DMA control circuitry may further: generate the data broadcast instruction, the data broadcast instruction having a format that includes: a first data field that includes information representative of a pointer to a memory address location containing the defined memory address offset; a second data field that includes information representative of a memory address location containing the first data value; a third data field that includes information representative of a defined number of memory addresses included in the plurality of memory addresses; and a fourth data field that includes information indicative of the base memory address location.

Example 3 may include elements of any of examples 1 or 2 and the DMA control circuitry may further: generate the data broadcast instruction having a format that includes: a fifth data field that includes information representative of a memory address location containing a second data value; and perform a first compare-overwrite operation, such that if existing data at respective ones of each of the plurality of memory addresses matches the second data value, the first data value replaces the existing data at the respective memory address.

Example 4 may include elements of any of examples 1 through 3 and the DMA control circuitry may further: perform a second compare-overwrite operation, such that if the existing data at respective ones of each of the plurality of memory addresses differs from the second data value, the existing data is retained at the respective memory address.

Example 5 may include elements of any of examples 1 through 4 and the DMA control circuitry may further: generate the array broadcast instruction, the array broadcast instruction having a format that includes: a first data field that includes information representative of a pointer to a memory address location containing the defined memory address offset; a second data field that includes information representative of the memory address location containing the elements included in the array broadcast to each of the plurality of memory addresses; a third data field that includes information representative of a defined number of memory addresses included in the plurality of memory addresses; and a fourth data field that includes information representative of the defined number of elements included in the array broadcast to each of the plurality of memory addresses; and a fifth data field that includes information representative of the base memory address location.

Example 6 may include elements of any of examples 1 through 5 and the DMA control circuitry may further: generate the array reduction instruction, the array reduction instruction having a format that includes: a first data field that includes information representative of a pointer to a memory address location containing the defined memory address offset; a second data field that includes information representative of the memory address location to receive the output value; a third data field that includes information representative of a number of memory addresses included in the plurality of memory address locations that contain a value used in the one or more operations; and a fourth data field that includes information representative of the base memory address location.

Example 7 may include elements of any of examples 1 through 6 where, in each of the data broadcast instruction, the array broadcast instruction, and the array reduction instruction the DMA control circuitry may further includes: a 15-bit DMA type field that includes information indicative of the direct memory access type associated with the respective instruction.

Example 8 may include elements of any of examples 1 through 7 where, in the 15-bit DMA type field, the DMA control circuitry may further include: information indicative of an operation performed using the data in the second instruction and the data stored at the respective memory address.

According to example 9, there is provided an electronic device. The electronic device may include: processor circuitry; memory circuitry coupled to the processor circuitry; and DMA control circuitry coupled to the memory circuitry, the DMA control circuitry to execute at least one of: a data broadcast instruction, an array broadcast instruction, or an array reduction instruction: wherein, upon execution of the data broadcast instruction, the DMA control circuitry to: causes a data broadcast operation of a first data value to each of a plurality of memory addresses that begin at a base memory address location included in the data broadcast instruction and increment by a defined memory address offset also included in the data broadcast instruction; wherein, upon execution of the array broadcast instruction, the DMA control circuitry to: cause an array broadcast operation of an array that includes a defined number of elements to each of a plurality of memory addresses that begin at a base memory address location included in the array broadcast instruction and increment by a defined memory address offset also included in the array broadcast instruction; and wherein, upon execution of the array reduction instruction, the DMA control circuitry to: perform one or more operations to generate an output value using respective values stored at each of a plurality of memory address locations, the plurality of memory address locations including a base memory address location included in the array reduction instruction and a defined memory address offset included in the array reduction instruction.

Example 10 may include elements of example 9 where the memory circuitry may include dual memory operation circuitry including memory interface circuitry communicatively coupled to atomic execution circuitry.

Example 11 may include elements of any of examples 9 or 10 and the DMA control circuitry may further: generate the data broadcast instruction, the data broadcast instruction having a format that includes: a first data field that includes information representative of a pointer to a memory address location containing the defined memory address offset; a second data field that includes information representative of a memory address location containing the first data value; a third data field that includes information representative of a defined number of memory addresses included in the plurality of memory addresses; and a fourth data field that includes information indicative of the base memory address location.

Example 12 may include elements of any of examples 9 through 11 and the DMA control circuitry may further: generate the data broadcast instruction having a format that includes: a fifth data field that includes information representative of a memory address location containing a second data value; and perform a first compare-overwrite operation, such that if existing data at respective ones of each of the plurality of memory addresses matches the second data value, the first data value replaces the existing data at the respective memory address Example 13 may include elements of any of examples 9 through 12 and the DMA circuitry may further: perform a second compare-overwrite operation, such that if the existing data at respective ones of each of the plurality of memory addresses differs from the second data value, the existing data is retained at the respective memory address.

Example 14 may include elements of any of examples 9 through 13 and the DMA control circuitry may further: generate the array broadcast instruction, the array broadcast instruction having a format that includes: a first data field that includes information representative of a pointer to a memory address location containing the defined memory address offset; a second data field that includes information representative of the memory address location containing the elements included in the array broadcast to each of the plurality of memory addresses; a third data field that includes information representative of a defined number of memory addresses included in the plurality of memory addresses; a fourth data field that includes information representative of the defined number of elements included in the array broadcast to each of the plurality of memory addresses; and a fifth data field that includes information representative of the base memory address location.

Example 15 may include elements of any of examples 9 through 14 and the DMA control circuitry may further: generate the array reduction instruction, the array reduction instruction having a format that includes: a first data field that includes information representative of a pointer to a memory address location containing the defined memory address offset; a second data field that includes information representative of the memory address location to receive the output value; a third data field that includes information representative of a number of memory addresses included in the plurality of memory address locations that contain a value used in the one or more operations; and a fourth data field that includes information representative of the base memory address location.

Example 16 may include elements of any of examples 9 through 15 where in each of the data broadcast instruction, the array broadcast instruction, and the array reduction instruction the DMA control circuitry may further include: a 15-bit DMA type field that includes information indicative of the direct memory access type associated with the respective instruction.

Example 17 may include elements of any of examples 9 through 16 where in the 15-bit DMA type field, the DMA control circuitry may further include: information indicative of an operation performed using the data in the second instruction and the data stored at the respective memory address.

According to example 18, there is provided a DMA broadcast method. The method may include: executing, by DMA control circuitry, at least one of: a data broadcast instruction, an array broadcast instruction, or an array reduction instruction: wherein executing the data broadcast instruction comprises: broadcasting, by the DMA control circuitry, a first data value to each of a plurality of memory addresses that begin at a base memory address location included in the data broadcast instruction and increment by a defined memory address offset also included in the data broadcast instruction; wherein executing the array broadcast instruction comprises: broadcasting, by the DMA control circuitry, an array that includes a defined number of elements to each of a plurality of memory addresses that begin at a base memory address location included in the array broadcast instruction and increment by a defined memory address offset also included in the array broadcast instruction; and wherein executing the array reduction instruction comprises: performing, by the DMA control circuitry, one or more operations to generate an output value using respective values stored at each of a plurality of memory address locations, the plurality of memory address locations including a base memory address location included in the array reduction instruction and a defined memory address offset included in the array reduction instruction.

Example 19 may include elements of example 18 where broadcasting the first data value to each of the plurality of memory addresses may further include: generating, by the DMA control circuitry, a data broadcast instruction that includes: a first data field that includes information representative of a pointer to a memory address location containing the defined memory address offset; a second data field that includes information representative of a memory address location containing the first data value; a third data field that includes information representative of a defined number of memory addresses included in the plurality of memory addresses; a fourth data field that includes information indicative of the base memory address location; and broadcasting the data broadcast instruction to each of the plurality of memory addresses.

Example 20 may include elements of any of examples 18 or 19 where generating the data broadcast instruction may further include: a fifth data field that includes information representative of a memory address location containing a second data value.

Example 21 may include elements of any of examples 18 through 20 and the method may additionally include: performing, by the DMA control circuitry, a compare-overwrite operation, such that if existing data at respective ones of each of the plurality of memory addresses matches the second data value, the first data value replaces the existing data at the respective memory address.

Example 22 may include elements of any of examples 18 through 21 and the method may additionally include: performing, by the DMA control circuitry, a compare-overwrite operation, such that if the existing data at respective ones of each of the plurality of memory addresses differs from the second data value, the existing data is retained at the respective memory address.

Example 23 may include elements of any of examples 18 through 22 where broadcasting the array that includes the defined number of elements to each of the plurality of memory addresses may further include: generating, by the DMA control circuitry, an array broadcast instruction that includes: a first data field that includes information representative of a pointer to a memory address location containing the defined memory address offset; a second data field that includes information representative of the memory address location containing the elements included in the array broadcast to each of the plurality of memory addresses; a third data field that includes information representative of a defined number of memory addresses included in the plurality of memory addresses; a fourth data field that includes information representative of the defined number of elements included in the array broadcast to each of the plurality of memory addresses; and a fifth data field that includes information representative of the base memory address location.

Example 24 may include elements of any of examples 18 through 23 where performing the one or more operations to generate the output value using respective values stored at each of the plurality of memory address locations may further include: generating, by the DMA control circuitry, an array reduction instruction that includes: a first data field that includes information representative of a pointer to a memory address location containing the defined memory address offset; a second data field that includes information representative of the memory address location to receive the output value; a third data field that includes information representative of a number of memory addresses included in the plurality of memory address locations that contain a value used in the one or more operations; and a fourth data field that includes information representative of the base memory address location.

Example 25 may include elements of any of examples 18 through 24 and the method may additionally include: inserting, by the DMA control circuitry, a 15-bit DMA type field that includes information indicative of the direct memory access type in each of the data broadcast instruction, the array broadcast instruction, and the array reduction instruction.

Example 26 may include elements of any of examples 18 through 25 where inserting the 15-bit DMA type field that includes information indicative of the direct memory access type may further include: inserting, by the DMA control circuitry, a 15-bit DMA type field that includes information indicative of an operation performed using the data in the second instruction and the data stored at the respective memory address.

According to example 27, there is provided a non-transitory storage device. The non-transitory storage device includes instructions that, when executed by direct memory access (DMA) control circuitry, cause the DMA control circuitry to: execute at least one of: a data broadcast instruction, an array broadcast instruction, or an array reduction instruction: wherein execution of the data broadcast instruction causes the DMA control circuitry to: broadcast a first data value to each of a plurality of memory addresses that begin at a base memory address location included in the data broadcast instruction and increment by a defined memory address offset also included in the data broadcast instruction; wherein execution of the array broadcast instruction causes the DMA control circuitry to: broadcast an array that includes a defined number of elements to each of a plurality of memory addresses that begin at a base memory address location included in the array broadcast instruction and increment by a defined memory address offset also included in the array broadcast instruction; and wherein execution of the array reduction instruction causes the DMA control circuitry to: perform one or more operations to generate an output value using respective values stored at each of a plurality of memory address locations, the plurality of memory address locations including a base memory address location included in the array reduction instruction and a defined memory address offset included in the array reduction instruction.

Example 28 may include elements of example 27 where the instructions that cause the DMA control circuitry to broadcast the first data value to each of the plurality of memory addresses further cause the DMA control circuitry to: generate a data broadcast instruction that includes: a first data field that includes information representative of a pointer to a memory address location containing the defined memory address offset; a second data field that includes information representative of a memory address location containing the first data value; a third data field that includes information representative of a defined number of memory addresses included in the plurality of memory addresses; a fourth data field that includes information indicative of the base memory address location; and broadcast the data broadcast instruction to each of the plurality of memory addresses.

Example 29 may include elements of any of examples 27 or 28 where the instructions that cause the DMA control circuitry to generate the data broadcast instruction may further cause the DMA control circuitry to: generate a data broadcast instruction that includes: a fifth data field that includes information representative of a memory address location containing a second data value.

Example 30 may include elements of any of examples 27 through 29 where the instructions may further cause the DMA control circuitry to: perform a first compare-overwrite operation, such that if existing data at respective ones of each of the plurality of memory addresses matches the second data value, the first data value replaces the existing data at the respective memory address.

Example 31 may include elements of any of examples 27 through 30 where the instructions may further cause the DMA control circuitry to: perform a second compare-overwrite operation, such that if the existing data at respective ones of each of the plurality of memory addresses differs from the second data value, the existing data is retained at the respective memory address.

Example 32 may include elements of any of examples 27 through 31 where the instructions that cause the DMA control circuitry to broadcast the array that includes the defined number of elements to each of the plurality of memory addresses may further cause the DMA control circuitry to: generate an array broadcast instruction that includes: a first data field that includes information representative of a pointer to a memory address location containing the defined memory address offset; a second data field that includes information representative of the memory address location containing the elements included in the array broadcast to each of the plurality of memory addresses; a third data field that includes information representative of a defined number of memory addresses included in the plurality of memory addresses; a fourth data field that includes information representative of the defined number of elements included in the array broadcast to each of the plurality of memory addresses; and a fifth data field that includes information representative of the base memory address location.

Example 33 may include elements of any of examples 27 through 32 where the instructions that cause the DMA control circuitry to perform the one or more operations to generate the output value using respective values stored at each of the plurality of memory address locations may further cause the DMA control circuitry to: generate an array reduction instruction that includes: a first data field that includes information representative of a pointer to a memory address location containing the defined memory address offset; a second data field that includes information representative of the memory address location to receive the output value; a third data field that includes information representative of a number of memory addresses included in the plurality of memory address locations that contain a value used in the one or more operations; and a fourth data field that includes information representative of the base memory address location.

Example 34 may include elements of any of examples 27 through 33 where the instructions may further cause the DMA circuitry to: insert into the instruction a 15-bit DMA type field that includes information indicative of the direct memory access type in each of the data broadcast instruction, the array broadcast instruction, and the array reduction instruction.

Example 35 may include elements of any of examples 27 through 34 where the instructions that cause the DMA control circuitry to insert into the instruction the 15-bit DMA type field that includes information indicative of the direct memory access type may further cause the DMA control circuitry to: insert into the instruction a 15-bit DMA type field that includes information indicative of an operation performed using the data in the second instruction and the data stored at the respective memory address.

According to example 36, there is provided a DMA broadcast system. The system may include: means for executing at least one of: a data broadcast instruction, an array broadcast instruction, or an array reduction instruction: wherein the means for executing the data broadcast instruction comprises: means for broadcasting a first data value to each of a plurality of memory addresses that begin at a base memory address location included in the data broadcast instruction and increment by a defined memory address offset also included in the data broadcast instruction; wherein the means for executing the array broadcast instruction comprises: means for broadcasting an array that includes a defined number of elements to each of a plurality of memory addresses that begin at a base memory address location included in the array broadcast instruction and increment by a defined memory address offset also included in the array broadcast instruction; and wherein the means for executing the array reduction instruction comprises: means for performing one or more operations to generate an output value using respective values stored at each of a plurality of memory address locations, the plurality of memory address locations including a base memory address location included in the array reduction instruction and a defined memory address offset included in the array reduction instruction.

Example 37 may include elements of examples 36 where the means for broadcasting the first data value to each of the plurality of memory addresses may further include: means for generating a data broadcast instruction that includes: a first data field that includes information representative of a pointer to a memory address location containing the defined memory address offset; a second data field that includes information representative of a memory address location containing the first data value; a third data field that includes information representative of a defined number of memory addresses included in the plurality of memory addresses; a fourth data field that includes information indicative of the base memory address location; and means for broadcasting the data broadcast instruction to each of the plurality of memory addresses.

Example 38 may include elements of any of examples 36 or 37 where the means for generating the data broadcast instruction may further include: means for generating a data broadcast instruction having a fifth data field that includes information representative of a memory address location containing a second data value.

Example 39 may include elements of any of examples 36 through 38, and the system may further include: means for performing a first compare-overwrite operation, such that if existing data at respective ones of each of the plurality of memory addresses matches the second data value, the first data value replaces the existing data at the respective memory address.

Example 40 may include elements of any of examples 36 through 39, and the system may further include: means for performing a second compare-overwrite operation, such that if the existing data at respective ones of each of the plurality of memory addresses differs from the second data value, the existing data is retained at the respective memory address.

Example 41 may include elements of any of examples 36 through 40 where the means for broadcasting the array that includes the defined number of elements to each of the plurality of memory addresses may further include: means for generating an array broadcast instruction that includes: a first data field that includes information representative of a pointer to a memory address location containing the defined memory address offset; a second data field that includes information representative of the memory address location containing the elements included in the array broadcast to each of the plurality of memory addresses; a third data field that includes information representative of a defined number of memory addresses included in the plurality of memory addresses; a fourth data field that includes information representative of the defined number of elements included in the array broadcast to each of the plurality of memory addresses; and a fifth data field that includes information representative of the base memory address location.

Example 42 may include elements of any of claims 36 through 41 where the means for performing the one or more operations to generate the output value using respective values stored at each of the plurality of memory address locations may further include: means for generating an array reduction instruction that includes: a first data field that includes information representative of a pointer to a memory address location containing the defined memory address offset; a second data field that includes information representative of the memory address location to receive the output value; a third data field that includes information representative of a number of memory addresses included in the plurality of memory address locations that contain a value used in the one or more operations; and a fourth data field that includes information representative of the base memory address location.

Example 43 may include elements of any of examples 36 through 42, and the system may further include: means for inserting a 15-bit DMA type field that includes information indicative of the direct memory access type in each of the data broadcast instruction, the array broadcast instruction, and the array reduction instruction.

Example 44 may include elements of any of examples 36 through 43 where the means for inserting the 15-bit DMA type field that includes information indicative of the direct memory access type may further include means for inserting a 15-bit DMA type field that includes information indicative of an operation performed using the data in the second instruction and the data stored at the respective memory address.

According to example 45, there is provided a system for performing one or more broadcast or reduction operations using direct memory access (DMA) control circuitry, the system being arranged to perform the method of any of examples 18 through 26.

According to example 46, there is provided a chipset arranged to perform the method of any of examples 18 through 26.

According to example 47, there is provided at least one non-transitory storage device that includes a plurality of instructions that, in response to be being executed on a computing device, cause the computing device to carry out the method according to any of examples 18 through 26.

According to example 48, there is provided a device configured for performing one or more broadcast or reduction operations using direct memory access (DMA) control circuitry, the device being arranged to perform the method of any of examples 18 through 26.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A direct memory access (DMA) system, comprising:
    DMA control circuitry coupleable to memory circuitry, the DMA control circuitry including:
    data broadcast logic to cause a performance of a data broadcast instruction to:
        cause a read of a first data value from a memory location in the memory circuitry; and
        cause a data broadcast operation of the first data value to each of a plurality of memory addresses, wherein a first one of the plurality of memory addresses is a base memory address location included in the data broadcast instruction and each successive one of the plurality of memory addresses is defined by an increment by a defined memory address offset also included in the data broadcast instruction with respect to a previous one of the plurality of memory addresses;
    array broadcast logic to cause a performance of an array broadcast instruction to:
        cause a read of an array that includes a defined number of elements from at least one memory location in the memory circuitry; and
        cause an array broadcast operation of the array to each of a plurality of memory addresses, wherein a first one of the plurality of memory addresses is a base memory address location included in the array broadcast instruction and each successive one of the plurality of memory addresses is defined by an increment by a defined memory address offset also included in the array broadcast instruction with respect to a previous one of the plurality of memory addresses; and
    array reduction logic to cause a performance of an array reduction instruction to:
        perform one or more operations to generate an output value using respective values stored at each of a plurality of memory address locations, wherein a first one of the plurality of memory address locations is a base memory address location included in the array reduction instruction and each successive one of the plurality of memory address locations is defined by an increment by a defined memory address offset included in the array reduction instruction with respect to a previous one of the plurality of memory address locations.

2. The system of claim 1, the data broadcast logic to further:
    generate the data broadcast instruction, the data broadcast instruction having a format that includes:
        a first data field that includes information representative of a pointer to a memory address location containing the defined memory address offset;
        a second data field that includes information representative of a memory address location containing the first data value;
        a third data field that includes information representative of a defined number of memory addresses included in the plurality of memory addresses; and
        a fourth data field that includes information indicative of the base memory address location.

3. The system of claim 1, the data broadcast logic to further:
    generate the data broadcast instruction having a format that includes:
        a data field that includes information representative of a memory address location containing a second data value; and
    perform a first compare-overwrite operation, such that if existing data at respective ones of each of the plurality of memory addresses matches the second data value, the first data value is to replace the existing data at the respective memory address.

4. The system of claim 3 the data broadcast logic to further:
    perform a second compare-overwrite operation, such that if the existing data at respective ones of each of the plurality of memory addresses differs from the second data value, the existing data is retained at the respective memory address.

5. The system of claim 1, the array broadcast logic to further:
    generate the array broadcast instruction, the array broadcast instruction having a format that includes:
        a first data field that includes information representative of a pointer to a memory address location containing the defined memory address offset;
        a second data field that includes information representative of the memory address location containing the elements included in the array broadcast to each of the plurality of memory addresses;

a third data field that includes information representative of a defined number of memory addresses included in the plurality of memory addresses;
a fourth data field that includes information representative of the defined number of elements included in the array broadcast to each of the plurality of memory addresses; and
a fifth data field that includes information representative of the base memory address location.

6. The system of claim 1, the array reduction logic to further:
generate the array reduction instruction, the array reduction instruction having a format that includes:
a first data field that includes information representative of a pointer to a memory address location containing the defined memory address offset;
a second data field that includes information representative of a memory address location to receive the output value;
a third data field that includes information representative of a number of memory addresses included in the plurality of memory address locations that contain a value used in the one or more operations; and
a fourth data field that includes information representative of the base memory address location.

7. The system of claim 1 wherein, in each of the data broadcast instruction, the array broadcast instruction, and the array reduction instruction the DMA control circuitry further includes:
a 15-bit DMA type field that includes information indicative of a direct memory access type associated with the respective instruction.

8. The system of claim 7 wherein, in the 15-bit DMA type field, the DMA control circuitry further includes:
information indicative of an operation performed using data in a second instruction and the data stored at the respective memory address.

9. A non-transitory storage device that includes instructions that, when executed by direct memory access (DMA) control circuitry, cause the DMA control circuitry to:
cause data broadcast logic to execute a data broadcast instruction to:
read a first data value at a memory location in memory circuitry; and
broadcast the first data value to each of a plurality of memory addresses, wherein a first one of the plurality of memory addresses is at a base memory address location included in the data broadcast instruction and each successive one of the plurality of memory addresses is defined by an increment by a defined memory address offset also included in the data broadcast instruction with respect to a previous one of the plurality of memory addresses;
cause array broadcast logic to execute an array broadcast instruction to:
read an array that includes a defined number of elements at a memory location in memory circuitry; and
broadcast the array to each of a plurality of memory addresses, wherein a first one of the plurality of memory addresses is at a base memory address location included in the array broadcast instruction and each successive one of the plurality of memory addresses is defined by an increment by a defined memory address offset also included in the array broadcast instruction with respect to a previous one of the plurality of memory addresses; and
cause array reduction logic to execute an array reduction instruction to:
perform one or more operations to generate an output value using respective values stored at each of a plurality of memory address locations, wherein a first one of the plurality of memory address locations is a base memory address location included in the array reduction instruction and each successive one of the plurality of memory address locations is defined by an increment by a defined memory address offset included in the array reduction instruction with respect to a previous one of the plurality of memory address locations.

10. The non-transitory storage device of claim 9 wherein the instructions that cause the DMA control circuitry to cause the data broadcast logic to broadcast the first data value to each of the plurality of memory addresses further cause the DMA control circuitry to cause the data broadcast logic to:
generate the data broadcast instruction to include:
a first data field that includes information representative of a pointer to a memory address location containing the defined memory address offset;
a second data field that includes information representative of a memory address location containing the first data value;
a third data field that includes information representative of a defined number of memory addresses included in the plurality of memory addresses; and
a fourth data field that includes information indicative of the base memory address location; and
broadcast the data broadcast instruction to each of the plurality of memory addresses.

11. The non-transitory storage device of claim 9 wherein the instructions that cause the DMA control circuitry to cause the data broadcast logic to generate the data broadcast instruction further cause the DMA control circuitry to cause the data broadcast logic to:
generate the data broadcast instruction to include:
a data field that includes information representative of a memory address location containing a second data value.

12. The non-transitory storage device of claim 11 wherein the instructions further cause the DMA control circuitry to cause the data broadcast logic to:
perform a first compare-overwrite operation, such that if existing data at respective ones of each of the plurality of memory addresses matches the second data value, the first data value is to replace the existing data at the respective memory address.

13. The non-transitory storage device of claim 12, wherein the instructions further cause the DMA control circuitry to cause the data broadcast logic to:
perform a second compare-overwrite operation, such that if the existing data at respective ones of each of the plurality of memory addresses differs from the second data value, the existing data is retained at the respective memory address.

14. The non-transitory storage device of claim 9 wherein the instructions that cause the DMA control circuitry to cause the array broadcast logic to broadcast the array that includes the defined number of elements to each of the plurality of memory addresses further cause the DMA control circuitry to cause the array broadcast logic to:

generate the array broadcast instruction to include:
a first data field that includes information representative of a pointer to a memory address location containing the defined memory address offset;
a second data field that includes information representative of the memory address location containing the elements included in the array broadcast to each of the plurality of memory addresses;
a third data field that includes information representative of a defined number of memory addresses included in the plurality of memory addresses; and
a fourth data field that includes information representative of the defined number of elements included in the array broadcast to each of the plurality of memory addresses; and
a fifth data field that includes information representative of the base memory address location.

15. The non-transitory storage device of claim 9 wherein the instructions that cause the DMA control circuitry to cause the array reduction logic to perform the one or more operations to generate the output value using respective values stored at each of the plurality of memory address locations further cause the DMA control circuitry to cause the array reduction logic to:
generate the array reduction instruction to include:
a first data field that includes information representative of a pointer to a memory address location containing the defined memory address offset;
a second data field that includes information representative of a memory address location to receive the output value;
a third data field that includes information representative of a number of memory addresses included in the plurality of memory address locations that contain a value used in the one or more operations; and
a fourth data field that includes information representative of the base memory address location.

16. The non-transitory storage device of claim 9 wherein the instructions further cause the DMA control circuitry to:
insert into a second instruction a 15-bit DMA type field that includes information indicative of a direct memory access type in each of the data broadcast instruction, the array broadcast instruction, and the array reduction instruction.

17. The non-transitory storage device of claim 16 wherein the instructions that cause the DMA control circuitry to insert into the second instruction the 15-bit DMA type field that includes information indicative of the direct memory access type further cause the DMA control circuitry to:
insert into the second instruction including the 15-bit DMA type field information indicative of an operation performed using data in the second instruction and the data stored at the respective memory address.

18. A DMA broadcast system, comprising:
means for executing a data broadcast operation to:
broadcast a first data value to each of a plurality of memory addresses in a memory circuitry, wherein a first one of the plurality of addresses is a base memory address location included in the data broadcast instruction and each successive one of the plurality of memory addresses is defined by an increment by a defined memory address offset also included in the data broadcast instruction with respect to a previous one of the plurality of memory addresses;
means for executing an array broadcast instruction to:
broadcast an array that includes a defined number of elements to each of a plurality of memory addresses in the memory circuitry, wherein a first one of the plurality of memory addresses is at a base memory address location included in the array broadcast instruction and each successive one of the plurality of memory addresses is defined by an increment by a defined memory address offset also included in the array broadcast instruction with respect to a previous one of the plurality of memory addresses; and
means for executing an array reduction instruction to:
perform one or more operations to generate an output value using respective values stored at each of a plurality of memory address locations in the memory circuitry, wherein a first one of the plurality of memory address locations is including a base memory address location included in the array reduction instruction and each successive one of the plurality of memory address locations is defined by an increment by a defined memory address offset included in the array reduction instruction with respect to a previous one of the memory address locations.

19. The system of claim 18 wherein the means for executing the data broadcast operation further comprises:
means for generating the data broadcast instruction to include:
a first data field that includes information representative of a pointer to a memory address location containing the defined memory address offset;
a second data field that includes information representative of a memory address location containing the first data value;
a third data field that includes information representative of a defined number of memory addresses included in the plurality of memory addresses;
a fourth data field that includes information indicative of the base memory address location; and
means for broadcasting the data broadcast instruction to each of the plurality of memory addresses.

20. The system of claim 18 wherein the means for executing the data broadcast operation further includes:
means for generating the data broadcast instruction to include a data field that includes information representative of a memory address location containing a second data value.

21. The system of claim 20, further comprising:
means for performing a first compare-overwrite operation, such that if existing data at respective ones of each of the plurality of memory addresses matches the second data value, the first data value is to replace the existing data at the respective memory address.

22. The system of claim 21, further comprising:
means for performing a second compare-overwrite operation, such that if the existing data at respective ones of each of the plurality of memory addresses differs from the second data value, the existing data is retained at the respective memory address.

23. The system of claim 18 wherein the means for executing the array broadcast operation further comprises:
means for generating the array broadcast instruction to include:
a first data field that includes information representative of a pointer to a memory address location containing the defined memory address offset;
a second data field that includes information representative of the memory address location containing the elements included in the array broadcast to each of the plurality of memory addresses;

a third data field that includes information representative of a defined number of memory addresses included in the plurality of memory addresses;

a fourth data field that includes information representative of the defined number of elements included in the array broadcast to each of the plurality of memory addresses; and a fifth data field that includes information representative of the base memory address location.

24. The system of claim 18 wherein the means for executing the array reduction operation further comprises:

means for generating the array reduction instruction to include:

a first data field that includes information representative of a pointer to a memory address location containing the defined memory address offset;

a second data field that includes information representative of a memory address location to receive the output value;

a third data field that includes information representative of a number of memory addresses included in the plurality of memory address locations that contain a value used in the one or more operations; and a fourth data field that includes information representative of the base memory address location.

25. The system of claim 18, further comprising:

means for inserting into a second instruction a 15-bit DMA type field that includes information indicative of a direct memory access type in each of the data broadcast instruction, the array broadcast instruction, and the array reduction instruction.

26. The system of claim 25 wherein the means for inserting the 15-bit DMA type field that includes information indicative of the direct memory access type further comprises:

means for inserting into the second instruction including the 15-bit DMA type field information indicative of an operation performed using data in the second instruction and the data stored at the respective memory address.

* * * * *

UNITED STATES PATENT AND TRADEMARK OFFICE
CERTIFICATE OF CORRECTION

PATENT NO. : 10,983,793 B2
APPLICATION NO. : 16/369846
DATED : April 20, 2021
INVENTOR(S) : Joshua Fryman et al.

Page 1 of 1

It is certified that error appears in the above-identified patent and that said Letters Patent is hereby corrected as shown below:

In the Claims

Column 50:
Line 14, "address locations is including a base memory address" should be --address locations is a base memory address--.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*